US010002357B2

(12) United States Patent
Canpolat et al.

(10) Patent No.: US 10,002,357 B2
(45) Date of Patent: Jun. 19, 2018

(54) WI-FI LOCATION BASED APPLICATION DOWNLOAD AND DISCOVERY

(71) Applicant: INTEL IP CORPORATION, Santa Clara, CA (US)

(72) Inventors: Necati Canpolat, Beaverton, OR (US); Vivek Gupta, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 662 days.

(21) Appl. No.: 14/581,145

(22) Filed: Dec. 23, 2014

(65) Prior Publication Data

US 2016/0180345 A1 Jun. 23, 2016

(51) Int. Cl.
*G06Q 30/00* (2012.01)
*H04L 29/08* (2006.01)
*H04W 4/00* (2018.01)
*H04W 84/12* (2009.01)

(52) U.S. Cl.
CPC ........... *G06Q 30/00* (2013.01); *H04L 67/306* (2013.01); *H04W 4/00* (2013.01); *H04W 84/12* (2013.01)

(58) Field of Classification Search
CPC ........ G06Q 30/00; H04W 4/00; H04W 84/12; H04L 67/306
See application file for complete search history.

(56) References Cited

U.S. PATENT DOCUMENTS

| 2008/0155094 A1 | 6/2008 | Roese et al. |
| 2009/0022076 A1 | 1/2009 | Canpolat et al. |
| 2010/0271978 A1 | 10/2010 | Gupta et al. |
| 2011/0280227 A1 | 11/2011 | McCann et al. |
| 2012/0066035 A1* | 3/2012 | Stanger ............... G06Q 30/0207 705/14.1 |
| 2012/0076117 A1* | 3/2012 | Montemurro ......... H04W 48/16 370/338 |
| 2012/0244902 A1* | 9/2012 | Saito ..................... H04W 84/20 455/517 |

(Continued)

FOREIGN PATENT DOCUMENTS

WO WO 2014/137613 9/2014

OTHER PUBLICATIONS

International Preliminary Report on Patentability for corresponding International Application No. PCT/US2014/017405, dated Aug. 25, 2015.

(Continued)

*Primary Examiner* — Nathan Mitchell
(74) *Attorney, Agent, or Firm* — Jason H. Vick; Sheridan Ross, PC

(57) ABSTRACT

Techniques for presenting venue based services in a WLAN environment are provided. Specifically, methods that when taken alone or together, provide a device or group of devices with an efficient way of accessing venue based applications and advertisements while reducing application pollution. The present disclosure includes a system that provides a user with automatic network and application discovery while in the vicinity of a venue. If the system detects that the application is not installed in the wireless device, the venue specific application is presented to the user for download and install. The system can also recognize a user's preferences and tailor the application and advertisement provided accordingly.

25 Claims, 13 Drawing Sheets

(56) References Cited

U.S. PATENT DOCUMENTS

| | | | |
|---|---|---|---|
| 2014/0293978 A1* | 10/2014 | Yang .................... | H04W 8/005 370/338 |
| 2015/0071141 A1* | 3/2015 | Vallabhu ........... | H04W 52/0229 370/311 |
| 2015/0254704 A1* | 9/2015 | Kothe .................... | G06Q 30/06 705/14.26 |
| 2015/0327160 A1* | 11/2015 | Yang .................... | H04W 48/18 370/254 |
| 2015/0371273 A1 | 12/2015 | Canpolat et al. | |
| 2016/0021525 A1* | 1/2016 | Mani .................... | H04W 8/005 455/434 |
| 2016/0094946 A1* | 3/2016 | Keithley ............... | H04W 4/023 455/456.3 |
| 2016/0183169 A1* | 6/2016 | Horn .................... | H04W 48/14 709/225 |

OTHER PUBLICATIONS

International Search Report for corresponding International Application No. PCT/US2014/017405, dated Jun. 26, 2014.
Written Opinion for corresponding International Application No. PCT/US2014/017405, dated Jun. 26, 2014.

* cited by examiner

| Element List | Subtype Value | Extensible |
|---|---|---|
| Reserved | 0 | |
| HS Query List | 1 | |
| HS Capability List | 2 | |
| Operator Friendly List | 3 | |
| WAN Metrics | 4 | Yes |
| Connection Capability | 5 | |
| NAI Home Realm Query | 6 | |
| Operating Class Indication | 7 | |
| Venue Based Services Query | 12 | |
| Reserved | 13-255 | |

*Fig. 7*

WI-FI LOCATION BASED APPLICATION DOWNLOAD AND DISCOVERY

TECHNICAL FIELD

Embodiments pertain to wireless networks. Some embodiments relate to wireless networks that operate in accordance with one of the Institute of Electrical and Electronics Engineers (IEEE) 802.11 standards including the IEEE 802.11-2012 standards. Some embodiments relate to the access of a communication service. Some embodiments relate to Venue Based Services (VBS) for Wireless LAN (WLAN) networks.

BACKGROUND

Wireless devices are increasingly used for location based discovery and services. Wi-Fi networks have a high penetration in many venues globally and Wi-Fi is a standard feature in wireless devices. Hence, Wi-Fi is being used for enabling location based services in many venues.

Brick-and-mortar stores want to bring the online digital experience to their customers in their stores. More and more venues such as retail stores, shopping centers, hotels, airports, etc., are coming up with their own venue or store specific applications to be able to connect with their customers nearby or in store so that they can increase revenues.

For these venue specific applications, the users need to download and install the application on their wireless devices. Venue specific applications require the user to go to an online application distribution center specific to the device. The user either knows the name of the store specific application in advance or searches for it in the application distribution center. The user locates the application in the application distribution center, downloads the application and installs the application on the device. The user may then use the application when in or in proximity to the store.

A number of issues are arising from this scenario. Users are installing hundreds of applications on their devices, applications are often forgotten, and/or due to inconvenience, the applications are not retrieved when the user is at the venue. These issues are known as "application pollution" and cause application fatigue on the devices. It is with respect to these and other considerations that the present improvements have been developed.

The 802.11 standard specifies a common Medium Access Control (MAC) Layer which provides a variety of functions that support the operation of 802.11-based wireless LANs (WLANs). The MAC Layer manages and maintains communications between 802.11 stations (such as between radio network cards (NIC) in a PC or other wireless devices or stations (STA) and access points (APs)) by coordinating access to a shared radio channel and utilizing protocols that enhance communications over a wireless medium.

802.11n introduced 2009, improved maximum single-channel data rate from 54 Mbps of 802.11g to over 100 Mbps. 802.11n also introduced MIMO (multiple input/multiple output), where, according to the standard, up to 4 separate physical transmit and receive antennas carry independent data that is aggregated in a modulation/demodulation process in the transceiver.

The IEEE 802.11ac specification operates in the 5 GHz band and adds channel bandwidths of 80 MHz and 160 MHz with both contiguous and non-contiguous 160 MHz channels for flexible channel assignment. 802.11ac also adds higher order modulation and supports multiple concurrent downlink transmissions ("multi-user MIMO" (MU-MIMO)), which allows transmission to multiple spatial streams to multiple clients simultaneously. By using smart antenna technology, MU-MIMO enables more efficient spectrum use, higher system capacity and reduced latency by supporting up to four simultaneous user transmissions. 802.11ac streamlines the existing transmit beamforming mechanisms which significantly improves coverage, reliability and data rate performance.

IEEE 802.11ax is the successor to 802.11ac and is proposed to increase the efficiency of WLAN networks, especially in high density areas like public hotspots and other dense traffic areas. 802.11ax will also use orthogonal frequency-division multiple access (OFDMA). Related to 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an exemplary access network query protocol information elements;

DESCRIPTION OF EMBODIMENTS

Figure 1:
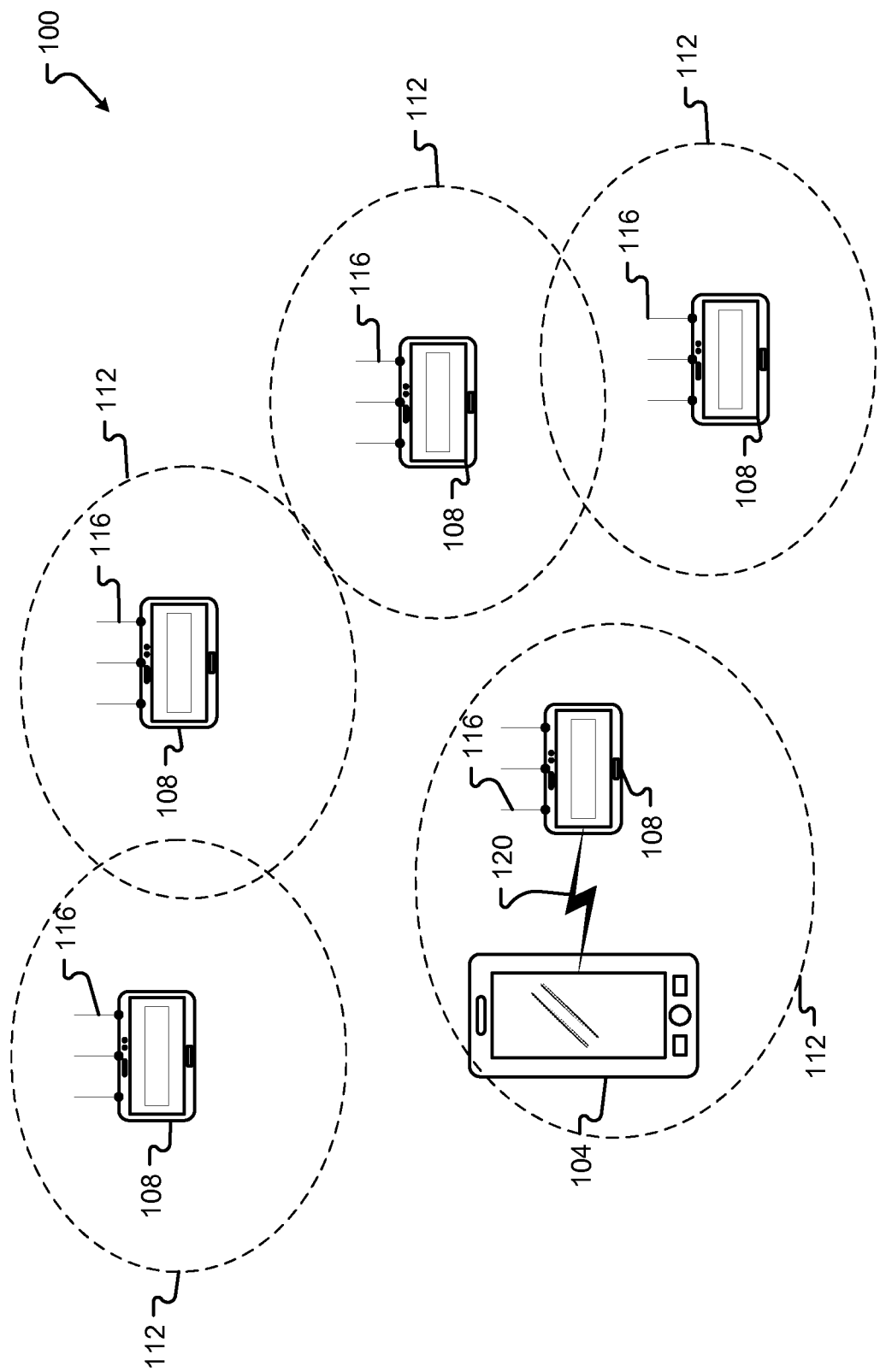
FIG. 1 illustrates an exemplary communication environment.

Embodiments may be implemented as part of Wi-Fi Alliance® Technical Committee Hotspot 2.0 Technical Task Group Hotspot 2.0 (Release 2) Technical Specification, Version 2.04, Jan. 2, 2013. However, the embodiments are not limited to 802.11 standards or Hotspot 2.0 standards. Embodiments can be used in implementation with other wireless communications standards and the like.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however, that in general, the systems, methods and techniques disclosed herein will work equally well for other types of communications environments, networks and/or protocols.

For purposes of explanation, numerous details are set forth in order to provide a thorough understanding of the present techniques. It should be appreciated however, that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operation or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

Presented herein are embodiments of systems, processes, data structures, user interfaces, etc. The embodiments may relate to a communication device and/or communication system. The communication system can include venue specific advertising. Venue specific advertising can include communication associated with a venue and/or communication associated with one or more devices. The overall design and functionality of the system described herein is to provide a user with an enhanced user experience by making applications available to a user in a more useful and efficient manner.

Embodiments provide novel networking mechanisms that facilitate a fast and efficient process for identifying applications on a wireless device. The embodiments generally reduce or remove manual operations currently needed in determining, which, if any of the applications currently installed in the wireless device correspond to a particular venue. The embodiments enable a wireless device to automatically identify applications available within the proximity of an access point. As a result, the embodiments facilitate application discovery, enhance user experience through application auto-discovery and tailored advertisements, and reduce application pollution. Other advantages exist as well as will be discussed herein.

A communication environment 100 may include communication between various devices and access points as shown in FIG. 1. The communication environment 100 can contain multiple communication points that are deployed as access points (AP) 108. The APs 108 may be associated with a various business, retail stores, shopping centers, airports, etc., and in general can be associated with any entity, building, facility or the like. The communication environment 100 can also include one or more wireless devices 104. The wireless device 104 may be a laptop computer, smartphone, wireless device, notebook, subnotebook, a tablet or other electronic computing device or communications device or videogame device or the like. The wireless device 104 may communicate via a communication channel 120 with an AP 108 as it enters the AP geo-fence 112 or comes in proximity with the AP 108. The access point can have one or more antennas 116 for communicating with the wireless device 104. The AP 108 and the wireless device 104 can be mobile or stationary.

Figure 2:
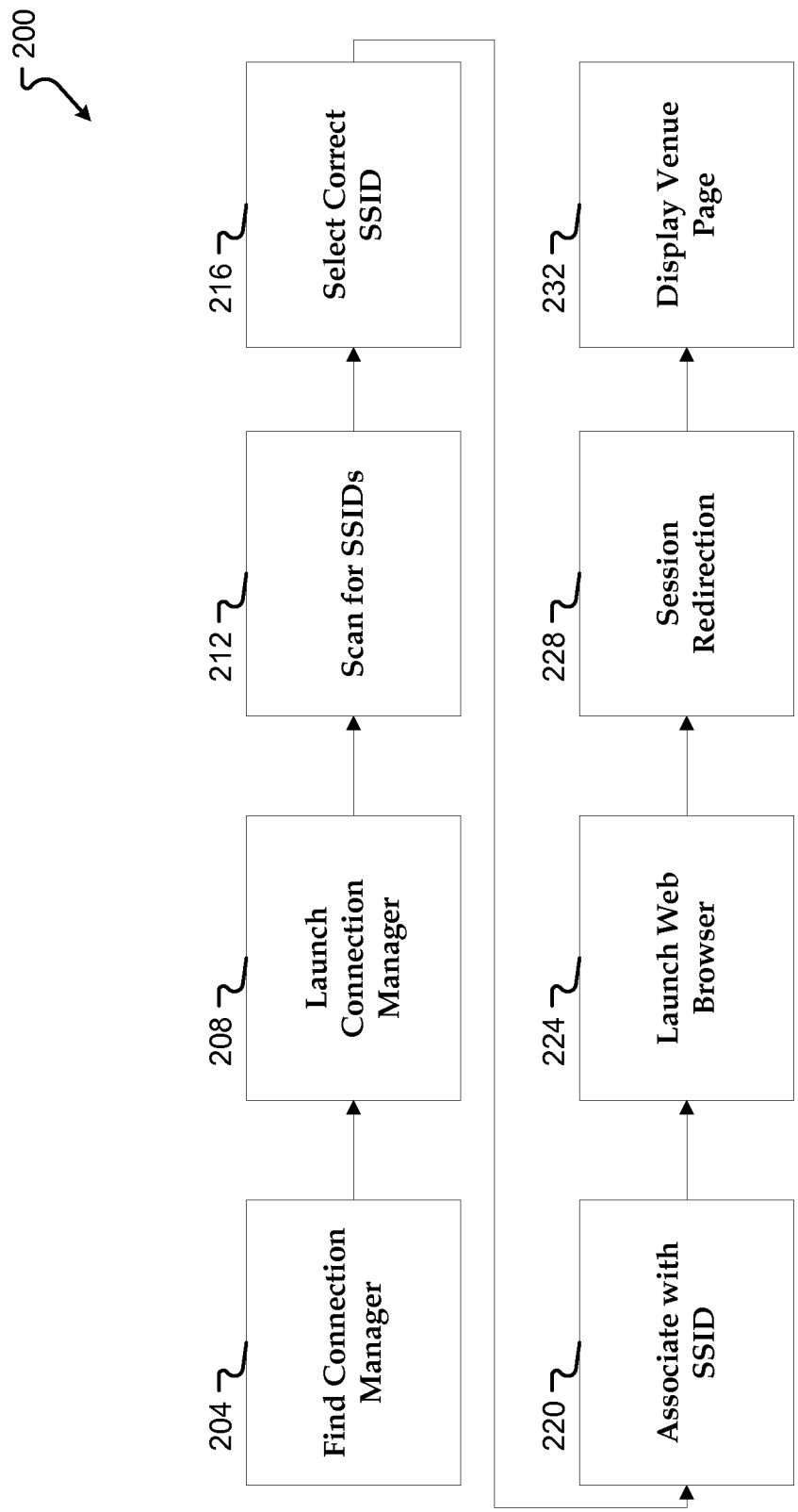
FIG. 2 illustrates an exemplary network discovery technique for presenting venue based Wi-Fi advertisement.

An embodiment of a wireless device 104 communication with an AP 108 is shown in FIG. 2. The network discovery technique 200 depicted in FIG. 2 provides an example of a conventional process or flow involved in the communication between the wireless device 104 and the AP 108. In the network discovery technique 200, the wireless device 104 initiates communication by finding 204 and launching 208 a connection manager resident in the wireless device 104. Once found and launched, the connection manager helps identify publically available wireless networks. In identifying the networks, the wireless device 104 scans for available Service Set Identifiers (SSID) 212. A SSID typically represents the name given to a Wireless Local Area Network (WLAN). From the identified SSIDs, the user selects the correct SSID 216 corresponding to the desired wireless hotspot. Selecting the desired SSID will then enable the association process between the SSID 220 and the wireless device 104. The user may then manually launch a web browser 224 which will trigger the hotspot to launch a web page on the wireless device 104. In an alternative scenario, the wireless device 104 automatically launches a web browser 224 which will trigger the hotspot to launch a web page on the wireless device 104. Consequently, this trigger may redirect a browser session 228 to a web page associated with the hotspot owner. In some embodiments, proper user credentials may be requested to access the provider hotspot. In other embodiments, specific menu requirements and selection of required menu items may be needed for access. While still in other embodiments, immediate display of a venue page may be provided 232. The venue page may then include general advertising information, user specific advertisements, coupons, and other such information.

Figure 3:
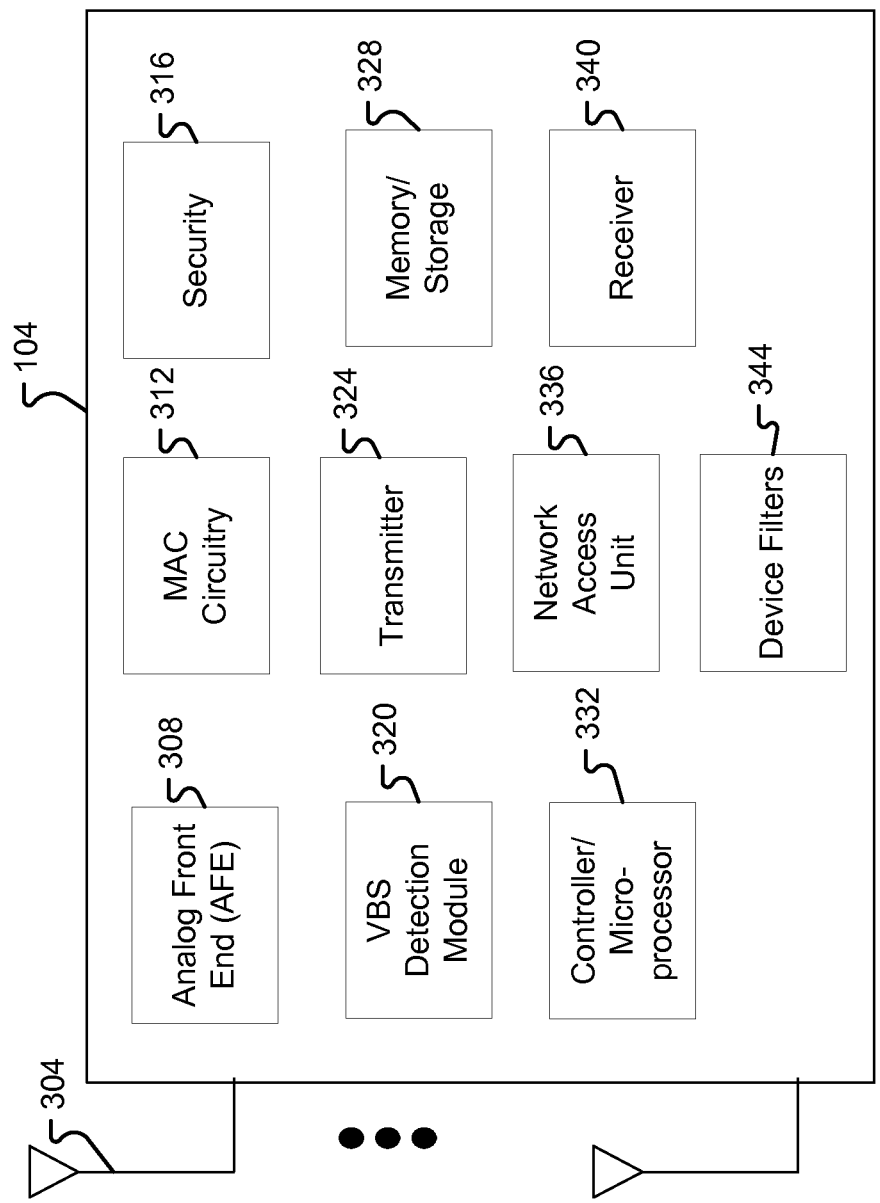
FIG. 3 illustrates an exemplary wireless device.

An example of a wireless device 104 architecture is shown in FIG. 3. The wireless device 104 may comprise hardware circuitry and/or software that conduct various operations. The operations can include, but are not limited, to conducting calls, synchronizing with access points 112, opening multiple applications, presenting information through audio and/or video means, taking pictures, communicating with venue specific devices, communicating with venue specific networks, etc. The wireless device 104 can be any type of computing system operable to conduct the operations described here. As an example, the wireless device 104 can be a mobile phone which includes and interacts with various modules and components 308-344 as shown in FIG. 3.

The wireless device 104 can have one more antennas 304, for use in wireless communications such as multi-input multi-output (MIMO) communications, Bluetooth®, etc. The antennas 304 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 304 generally interact with an Analog Front End (AFE) module 308, which is needed to enable the correct processing of the received modulated signal. The AFE 308 can sit between the antenna and a digital baseband system in order to convert the analog signal into a digital signal for processing.

The wireless device 104 can also include a controller/microprocessor 332 and a memory/storage 328. The wireless device 104 can interact with the memory/storage 328 which may store information and operations necessary for configuring and transmitting or receiving the message frames described herein. The memory/storage 328 may also be used in connection with the execution of application programming or instructions by the controller/microprocessor 332, and for temporary or long term storage of program instructions and/or data. As examples, the memory/storage 328 may comprise a computer-readable device, RAM, ROM, DRAM, SDRAM or other storage devices and media.

The controller/microprocessor 332 may comprise a general purpose programmable processor or controller for executing application programming or instructions related to the wireless device 104. Further, controller/microprocessor 332 can perform operations for configuring and transmitting message frames as described herein. The controller/microprocessor 332 may include multiple processor cores, and/or implement multiple virtual processors. Optionally, the controller/microprocessor 332 may include multiple physical processors. By way of example, the controller/microprocessor 332 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The wireless device 104 can further include a transmitter 324 and receiver 340 which can transmit and receive signals, respectively, to and from other wireless devices 104 or access points 108 using one or more antennas, 304 and 116 respectively. Included in the wireless device 104 circuitry is the medium access control or MAC Circuitry 312. MAC circuitry 312 provides the medium for controlling access to the wireless medium. In an exemplary embodiment, the MAC circuitry 312 may be arranged to contend for a wireless medium and configure frames or packets for communicating over the wireless medium. The MAC circuitry 312 can work together or independently of a Venue Based Services (VBS) detection module 320, which can aid in identifying VBS enabled access points 108. The VBS detection module 320, can but is not limited to, providing a wireless device 104 with a prompt advertising the existence of an AP 108 in the vicinity, providing the AP 108 with user ID information for communicating with a venue specific communication device, responding to Venue Based Services Queries from the VBS device, etc. The VBS detection module 320, can also work with the device filters module 344, which can be a module that filters the information that can be provided to the venue. Such filters can include security settings enable by the user allowing access to only certain secured sites, demographic information, information on the wireless device or other settings which limit what can be retrieved by a component or device exterior to the wireless device.

The wireless device 104 can also contain a security module 316. This security module 316 can contain information regarding but not limited to, security parameters required to connect the wireless device 104 to AP 108 or other available networks, and can include WEP or WPA security access keys, network keys, etc. The WEP security access key is a security password used by Wi-Fi networks. Knowledge of this code will enable the wireless device 104 to exchange information with the access point 108. The information exchange can occur through encoded messages with the WEP access code often being chosen by the network administrator. WPA is an added security standard that is also used in conjunction with network connectivity with stronger encryption than WEP.

Another module that the wireless device 104 can include is the network access unit 336. The network access unit 336 can be used for connectivity with the access point 108. In one exemplary embodiment, the connectivity can include synchronization between devices. In another exemplary embodiment, the network access unit 336 can work as a medium which provides support to the VBS detection module 320 for communication with venue specific hotspots. In yet another embodiment, the network access unit 336 can work in conjunction with at least the MAC circuitry 312. The network access unit 336 can also work and interact with one or more of the modules described herein.

The modules described and others known in the art can be used with the communication system 104 and can be configured to perform the operations described herein in conjunction with FIG. 1 and FIGS. 3-14.

Figure 4:
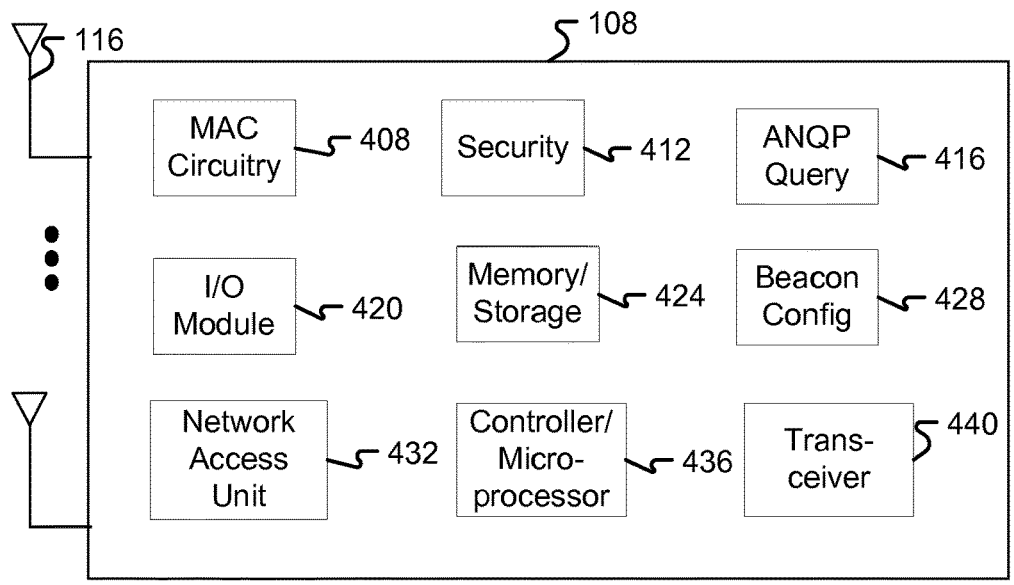
FIG. 4 illustrates an exemplary access point.

An example of access point/communication device 108 architecture is shown in FIG. 4. The access point 108 may comprise hardware and/or software that conduct various operations. The operations can include, but are not limited, to broadcasting venue specific information, providing a medium for communication between a wireless device 104 and a venue specific device such as a server, synchronizing with wireless devices 104, providing hotspot identification, etc. The access point 108 can be any type of computing system operable to conduct the operations described here. As an example, the access point 108 can be a router which includes and interacts with various modules and components 408-440 as shown in FIG. 4.

The access point 108 can have one more antennas 116, for use in wireless communications such as multi-input single-output (MISO), single-input multi-output (SIMO), MIMO or the like. The antennas 116 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

The access point 108 can also include a controller/microprocessor 436 and a memory/storage 424. The access point 108 can interact with the memory/storage 424 which may store information and operations necessary for configuring and transmitting or receiving the message frames described herein. The memory/storage 424 may also be used in connection with the execution of application programming or instructions by the controller/microprocessor 436, and for temporary or long term storage of program instructions and/or data. As examples, the memory/storage 424 may comprise a computer-readable device, RAM, ROM, DRAM, SDRAM or other storage devices and media.

The controller/microprocessor 436 may comprise a general purpose programmable processor or controller for executing application programming or instructions related to the access point 108. Further, controller/microprocessor 436 can perform operations for configuring and transmitting beacons as described herein. The controller/microprocessor 436 may include multiple processor cores, and/or implement multiple virtual processors. Optionally, the controller/microprocessor 436 may include multiple physical processors. By way of example, the controller/microprocessor 436 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

An input/output (I/O) module 420 can also be part of the AP 108 architecture. The input/output module 420 and associated ports may be included to support communications over wired or wireless networks or links. For example, I/O module 420 can provide communication with wireless devices 104, servers, communication devices, and/or peripheral devices. Examples of an input/output module 420 include an Ethernet port, a Universal Serial Bus (USB) port, Institute of Electrical and Electronics Engineers (IEEE) port 1394, or other interface.

The access point 108 can further include a transceiver 440 which can transmit and receive signals to and from other wireless devices 104 or access points 108 and/or the Internet using one or more antennas, 304 and 116 respectively, and/or hard-wired links (not shown). Included in the AP 108 architecture is the medium access control or MAC circuitry 408. MAC circuitry 408 provides the medium for controlling access to the wireless medium. In an exemplary embodiment, the MAC circuitry 408 may be arranged to contend for a wireless medium and configure frames or packets for communicating over the wireless medium. The MAC circuitry module 408 can work together or independently of a network access unit 432, which can aid in broadcasting to the VBS enabled wireless devices 104 and connecting to them. In one exemplary embodiment, the connectivity can include synchronization between devices. The network access unit 432 can also work and interact with one or more of the modules described herein.

The beacon configuration module 428, can but is not limited to, allocating information in a beacon frame for broadcasting to wireless devices 104. Beacon configuration can include allocating information to one or more of the beacon header, body and tail. Among the information included in a beacon frame is the beacon interval, SSID of the AP 108 and destination address. Further details describing the byte distribution within a beacon frame and other included parameters are described in FIGS. 6A and 6B below. The beacon can also provide both the wireless device 104 and a venue specific device (i.e. VBS server) with ANQP or similarly developed service discovery query information. The beacon configuration module 428 can interact with an ANQP query module 416. The ANQP query module 416 can hold instructions detailing the services offered by the AP 108. The ANQP query module 416 is not limited to ANQP query information, this module can also be used independently, in conjunction to, or in addition to other modules with similarly developed service discovery query information. This module can also host the information needed to provide the wireless device 104 with details regarding the venue, Network Address Identifiers, Emergency Alert System messages, etc.

Access point 108 can also contain a security module 412. This security module 412 will contain information regarding, but not limited to, security parameters required to connect the wireless device 104 to AP 108 or other available networks, and can also include WEP or WPA security access keys, network keys, etc. The WEP security access key is a security password used by Wi-Fi networks. Knowledge of this code will provide the wireless device 104 with access to exchange information with the access point 108. The information exchange can occur through encoded messages and WEP access code is often chosen by the network administrator. WPA is an added security standard that is also used in conjunction with network connectivity with stronger encryption than WEP.

The modules described and others known in the art can be used with the Access point 108 and can be configured to perform the operations described herein and in conjunction with FIG. 1 and FIGS. 3-14.

Figure 5:
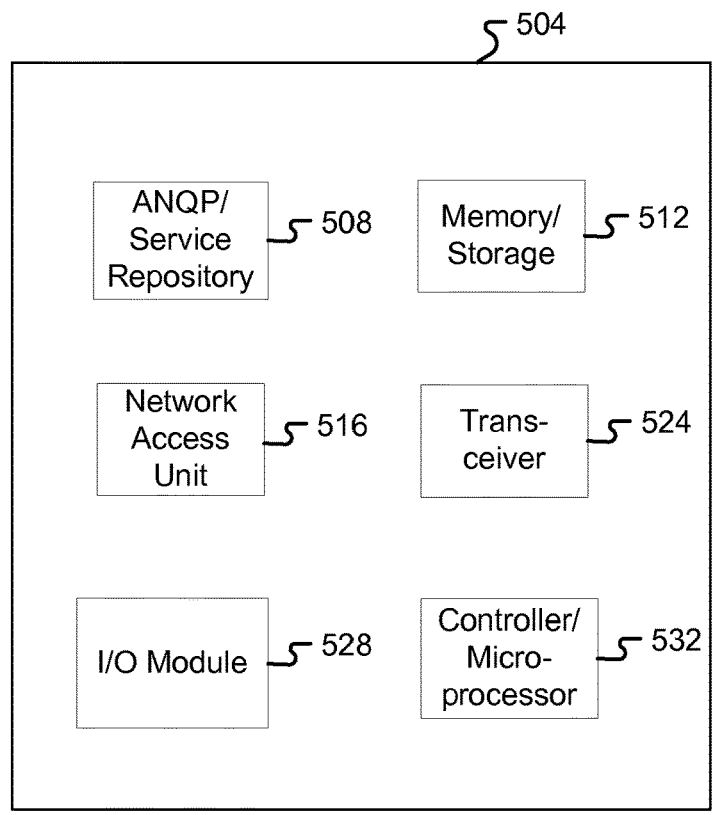
FIG. 5 illustrates an exemplary venue based services server.
Figure 6:
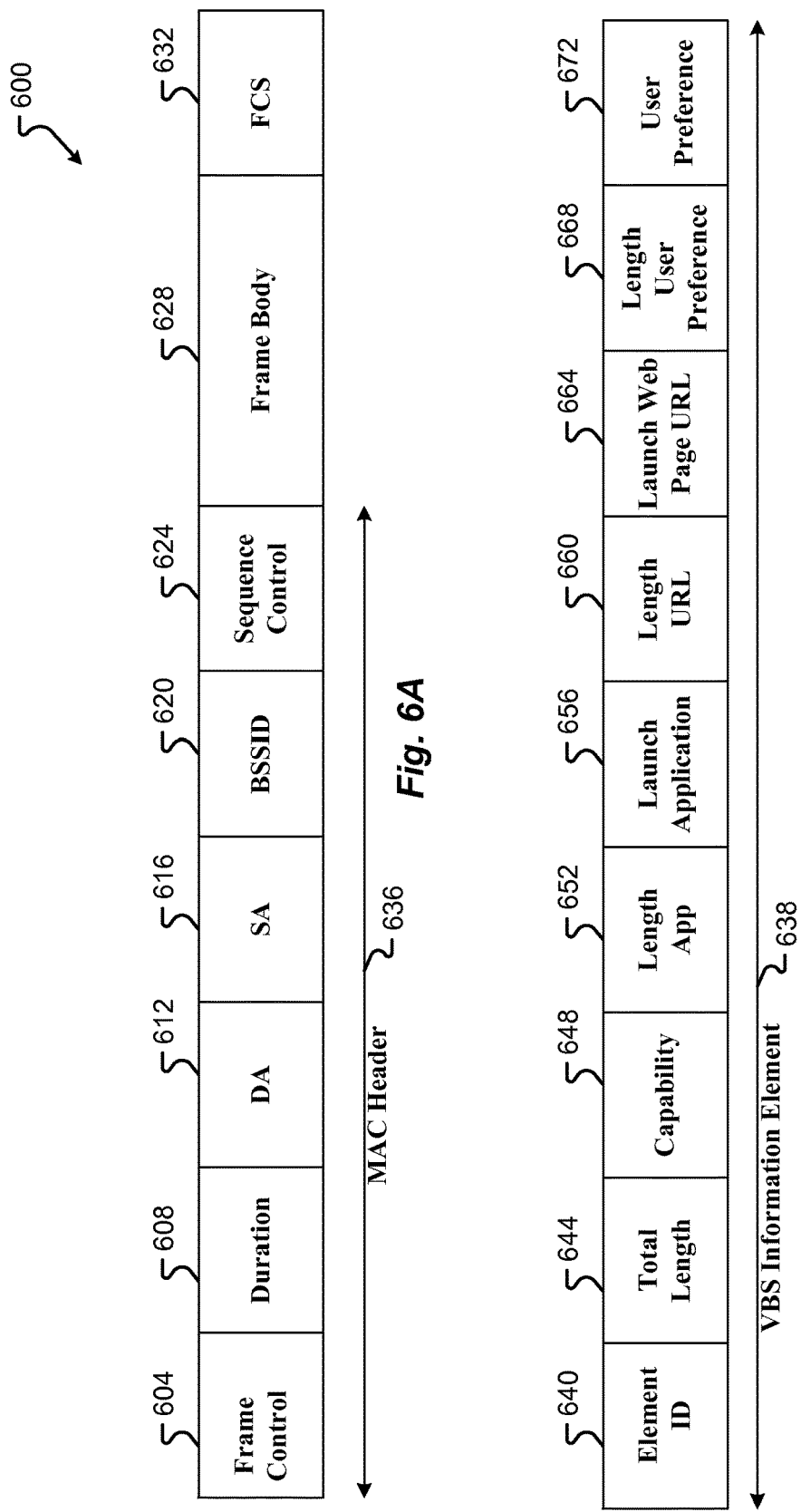
FIG. 6A illustrates an exemplary beacon frame.
FIG. 6B illustrates an exemplary venue based services information element.

An embodiment of VBS server 504 architecture is shown in FIG. 5. The VBS server 504 may comprise hardware and/or software that conduct various operations. The operations can include, but are not limited to, storing venue specific information, responding to communications between the wireless device 104 and an access point 108, etc. The VBS server 504 can be any type of computing system operable to conduct the operations described herein. As an example, the VBS server 504 can be a venue specific device, which includes and interacts with various modules and components 508-532 as shown in FIG. 5.

The VBS server 504 can also include a controller/microprocessor 532 and a memory/storage 512. The VBS server 504 can interact with the memory/storage 512 which may store information and operations necessary for configuring and transmitting or receiving the message frames described herein. The memory/storage 512 may also be used in connection with the execution of application programming or instructions by the controller/microprocessor 532, and for temporary or long term storage of program instructions and/or data. As examples, the memory/storage 512 may comprise a computer-readable device, RAM, ROM, DRAM, SDRAM or other storage devices and media.

The controller/microprocessor 532 may comprise a general purpose programmable processor or controller for executing application programming or instructions related to the VBS server 504. Further, controller/microprocessor 532 can perform operations for configuring and transmitting venue specific information as described herein. The controller/microprocessor 532 may include multiple processor cores, and/or implement multiple virtual processors. Optionally, the controller/microprocessor 532 may include multiple physical processors. By way of example, the controller/microprocessor 532 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

An I/O module 528 can also be part of the VBS server 504 architecture. The input/output module 528 and associated ports may be included to support communications over wired or wireless networks or links. For example, it can provide communication with access points/communication devices 108, and/or peripheral devices. Examples of an input/output module 528 include an Ethernet port, a Universal Serial Bus (USB) port, Institute of Electrical and Electronics Engineers (IEEE) port 1394, or other interface.

The VBS server 504 can further include a transceiver 524 which can transmit and receive signals to and from the access points 108 and other servers using one or more I/O modules 528 or ports. Included in the VBS Server 504 circuitry is a network access unit 516. The network access unit 516 provides the connectivity needed to communicate with the access points 108 which provide the medium for network communication with the wireless devices 104. The network access unit 516 can also work and interact with one or more of the modules described herein including the ANQP/Service repository 508.

The ANQP/Service repository 508, also part of the VBS server 504, can store the instructions detailing the services offered by the AP 108. This module can host the information needed to provide wireless device 104 with details regarding the venue, Network Address Identifiers, Emergency Alert System messages, tailored advertisements based on user preferences, etc.

The modules described and other known in the art can be used with the communication system 104 and can be configured to perform the operations described herein and in conjunction with FIG. 1 and FIGS. 3-14.

FIG. 6A is an embodiment of a beacon frame 600 configuration. The communication between a venue and a wireless device 104 begins with the reception of a beacon. In one embodiment, a venue can include, but is not limited to, retail shops, shopping centers, airports, sporting arenas, etc., and in general any location that has one or more access points 108, which have been configured to broadcast beacon signals which provide wireless devices 104 with venue specific information. The access point 108 broadcasts a beacon which provides wireless devices 104 with the information regarding available hotspots within proximity. The beacon frame 600 is generally organized with information that permits a wireless device 104 to connect to a specified network. A typical beacon frame is comprised of three parts, the MAC header 636, frame body 628 and a Frame Check Sequence (FCS) 632.

In general, the MAC header 636 contains two main components, general information regarding the communication process and the destination address (DA) 612. Other information contained within the header includes frame control information 604, duration 608, Source Address (SA) 616, Basic SSID (BSSID) information 620 and sequence control information 624. In one embodiment, these fields can also exist in the frame body 628. The frame body 628, in addition to possible header information also includes other relevant information such as, but not limited to, beacon interval information, SSIDs, parameter sets, capability information, supported rates and/or venue based services (VBS) information elements. Beacon intervals represent the amount of time between beacon transmissions. SSIDs correspond to the specific wireless LAN network names. Capability information provides information such as security requirements for clients to connect. VBS information elements are the information elements within the frame body 628 that enable VBS. For example, the information may provide that clients wanting to connect must be wired with WEP. In one embodiment, the beacon could provide a wireless device with capability information. In another embodiment, an ANQP or Service Query would provide the equivalent information. In yet another embodiment, the capability information could be venue specific. In a further embodiment, the information could be tailored to be wireless device specific.

In one embodiment, the frame body 628 can lie between the MAC header 636 and the FCS 632. In another embodiment, the body of the beacon frame 600 can lie on either end of the frame. FCS 632 is a frame redundancy check that provides error correction capabilities in a beacon frame 600.

FIG. 6B is an exemplary embodiment of a VBS Information Element 638 configuration. Here, the VBS Information Element 638 is contained in the frame body 628 of a beacon frame 600. The VBS Information Element 638 can be used to enable VBS on an access point. The VBS Information Element 638 can contain information specific to a venue such as, but not limited to, venue URL, capability, venue application, etc. An exemplary embodiment of the VBS Information Element 638 can include an Element ID 640, Total Length 644, Capability 648, Length App 652, Launch App 656, Length URL 660 and Launch Web Page URL 664. The Element ID 640 is an information element that can represent the ID of the VBS Information Element 638 in the beacon. The Total Length 644 can be used to define the length of the VBS Information Element 638. Capability 648 within the VBS Information Element 638, is used to enable VBS on the AP. This information element can, for example, use a 1 to represent enable and a 0 for not enabled. The information element, Length App 652, can be used to define the field length of the next information element in the VBS Information Element 638, the Launch Application 656. The Launch Application 656 specifies the application to be launched when a wireless device is with the geo-fence of the access point. Alternatively, the field defines the application the wireless device will be presented with when the user is in the vicinity of a venue.

VBS Information Element 638 can also be equipped to launch a venue specific website. As with the application, the information element Length URL 660 specifies a length of the Launch Web Page 664 field, while the Launch Web Page URL 664 element specifies the URL web page to be launched when a user is in the vicinity of a venue.

In one embodiment, the VBS Information Element 638, can also support user specific information. This information can be used during an ANQP query and response, to tailor and present a user with an application, web page, and/or combination thereof based on the user preferences. Two fields are used to describe user preferences information. The first field is the Length of User Preference 668 element, which can be used to specify the length of the User Preference 672 field. The second field, is the User Preference 672 field. This field specifies the user preference using, for example, a variable length XML schema. The XML schema can be used to reference an XML document which can contain the user preferences. These user preferences can be stored in a data structure like that described in conjunction with FIG. 13. Alternatively, the User Preference 672 field can be a variable length, RELAX NG and/or Schematron schema. Further, other types of schemas can also be used such as, but not limited to, database schemas and/or Document Type Definitions (DTDs) schemas. In another embodiment, the VBS Information Element 638 can include other related elements and/or coded differently.

A user can also query individual fields, such as those specified in the beacon frame 600, and more specifically, the VBS Information Element 638. Once a wireless device has identified an access point with VBS enabled, the wireless device can use the Access Network Query Protocol to determine properties of the AP. ANQP capability is enabled by adding to a Hotspot Capability list or ANQP Information Element table 700.

The wireless device can send an ANQP query with specified fields/properties the wireless device requires to the AP. Generally, a wireless device can assume Hotspot capability is enabled and thus can support ANQP query/response. The query by the wireless device can then be routed to a VBS server such as that described above and in conjunction with FIG. 5. The fields the wireless device selects in an ANQP query can be IEEE 802.11 ANQP Information Elements, Hotspot 2.0 ANQP Information Elements, and/or a combination thereof. In the present embodiment, venue specific elements are depicted in FIG. 7. Exemplary ANQP Hotspot Information Elements are listed in element list 704 of the ANQP Information Element table 700. Currently, up to 12 elements have been defined; however, room for up to 255 elements exists as seen 762.

Each of these information elements can be identified by a subtype value 708. If the subtype value is included in the ANQP query/response communication, a query request for that subtype value will return the corresponding element in the response. Exemplary ANQP Hotspot Information Elements include elements 716-758.

Information element HS Query List 720, for example, is an element in the list of identifiers queried by the wireless device. Alternatively, or in conjunction, the HS Capability list 724 element is a list of capabilities that have been configured on the AP.

Information elements Operator Friendly List 728 and WAN Metrics 732 provide details regarding Wide Area Network (WAN) connectivity. The Operator Friendly List 728 lists the operator names operating the IEEE 802.11an, while the WAN Metrics 732 provides information about the WAN link connecting IEEE 802.11an and the Internet. In addition, Connection Capability 736 provides connection status of the most commonly used communication protocols and Operating Class Indication 744, describes the group of channels the network is using. A Network Access Identifier (NAI) Home Realm Query 740 information element is also part of the HS ANQP information element list, which is used by the wireless device for security credentials.

Additional information elements can exist as part of the HS ANQP information element list as presented by the ellipses 748 and reserved 716 and 758. An additional information element that is presented in the current embodiment is the Venue Based Services Query 752. This information element enables venue based services and can provide venue specific information that can be tailored based on user preferences as described in conjunction with FIGS. 1-6 and 8-14. The ANQP information element table 700 can also include an Extensible field 712 which identifies elements that can be extended in future versions or revisions of the specification. For example, Yes 766 indicates that WAN Metrics 732 are extendable.

Figure 8:
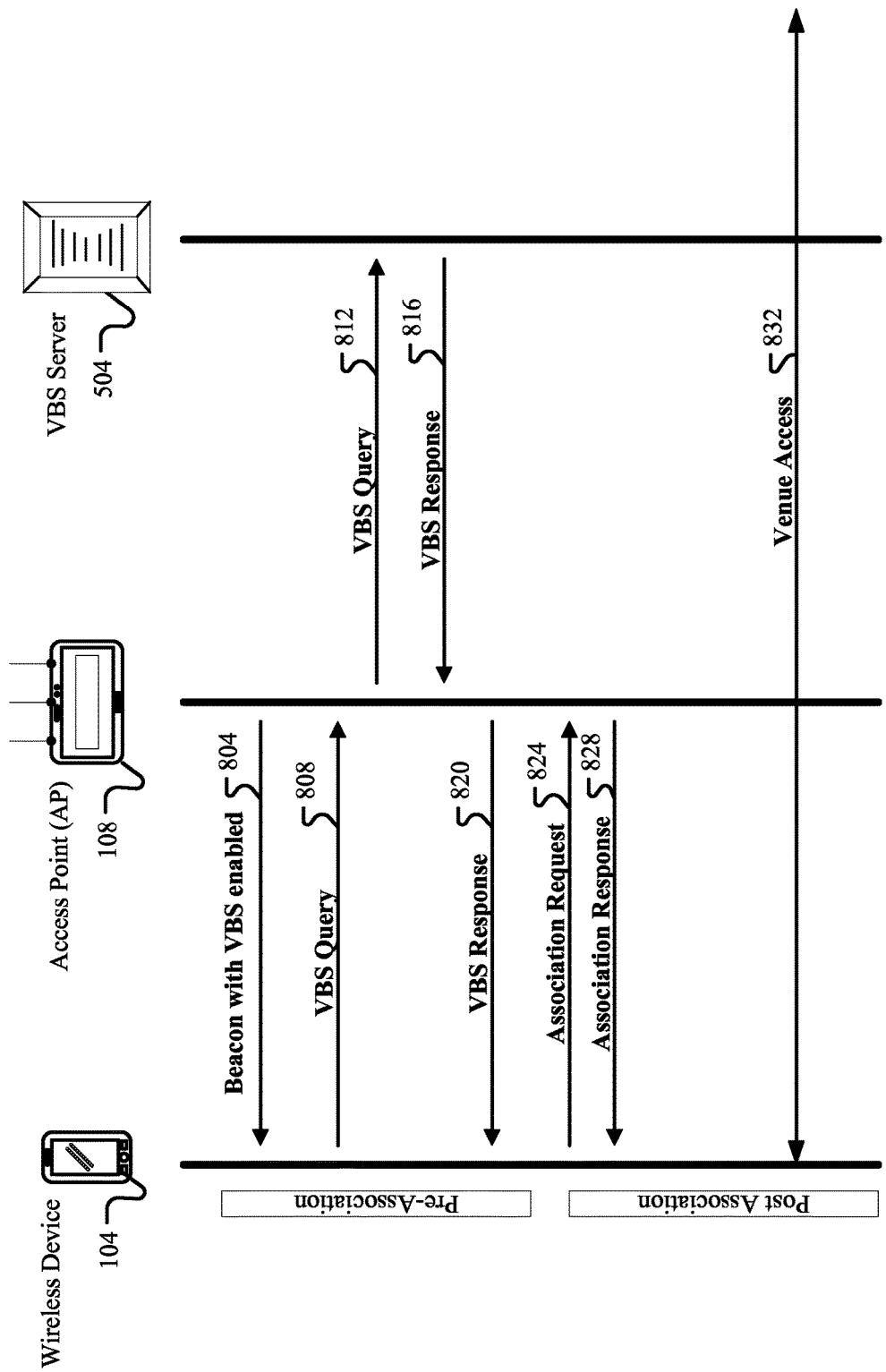
FIG. 8 illustrates an exemplary fence-post diagram showing a venue based services system.

An exemplary embodiment of message flow in a venue based services system is presented in FIG. 8. In the pre-association process between a wireless device 104 with venue based services (VBS) capability and the venue, the wireless device 104 must first be within a radio range or within the geo-fence of that venue's hotspot or access point 108. This access point/communication device 108 should be VBS enabled to be able to present its venue based information and/or advertisements to the wireless device 104. The wireless device 104 receives a beacon in 804 corresponding to the venues access point. The beacon will indicate whether the AP 108 provides support for the corresponding protocol in use and provide the Wi-Fi network name or SSID. Other information including network capability, venue specific information, network information, etc., can also be provided in the beacon as discussed. A more detailed description of the information is provided in conjunction with FIGS. 6A and 6B above. Then, the Wi-Fi network corresponding to the AP 108 advertises the availability of venue based services. In response to the beacon information provided, a wireless device 104 will query the AP 108 using the Access Network Query Protocol (ANQP) VBS query 808 to obtain information useful for the wireless device 104 for connectivity with the AP 108. The ANQP query, as described herein and as previously described in more detail above and in conjunction with FIG. 7, is a query and response protocol that is generally used by Wi-Fi hotpots to provide the services offered by the AP 108 to other wireless devices 104. For example, in an ANQP VBS response 816, 820, the wireless device 104, can obtain information like, but not limited to, the capabilities of the network, the venue associated with the AP 108, and other pertinent information for the wireless device 104 from a VBS server 504. In one embodiment, as part of the ANQP query command, the wireless device 104 can send in 808 the User ID associating the user with a venue to the access point 108 which routes 812 this information to the VBS server 504. The User ID can be a string that can be provisioned on the wireless device 104 when a user registers with the specific venue or when the user installs the venue specific application and indicates its preferences. The User ID can be flexible such that a user can connect from any device or even multiple devices. The routing between the wireless device 104, AP 108 and the VBS server 504 is seen in FIG. 8, with the router or AP 108 acts acting as a medium by which the devices (104 and 504) on the network can communicate.

In one embodiment, the VBS server 504 provides a VBS response 816 through the AP 108 which is then routed in 820 from the AP 108 to the wireless device 104. The VBS response from the AP 108 to the wireless device 104 includes information specific to the venue. In another embodiment, the VBS server 504 can retrieve user preferences and other contextual information from a data structure. In one embodiment, the data structure can be a user preference database. In another embodiment, the data structure with the user preferences can be similar to the exemplary embodiment described in conjunction with FIGS. 5 and 13. In another exemplary embodiment, the VBS server 504, based on the user contextual information, prepares a specific web page with information tailored for the specific user. The URL of this webpage can be sent to the wireless device 104 as part of the VBS response message 816 via a message such as a text message. In one embodiment, the web page is displayed on the wireless device 104 on a web browser. In another embodiment, the specific information is directed to and displayed by the VBS application on the wireless device 104.

Once a VBS response is obtained in 820 by the by wireless device 104, the wireless device 104 can optionally place an association request 824 and obtain an association response 828 with the identified access point 108. Upon association, the wireless device 104 obtains venue access in 832. In one embodiment, the association process occurs when a wireless device 104 launches an already existing venue specific application. In another embodiment, association can occur when the wireless device 104 having not found the application provides the user with the option to download and install the application, at which point the user installs the application and the system associates with the venue. In yet another embodiment, the user is prompted and selects the option to associate via, for example, a graphical user interface.

Figure 9:
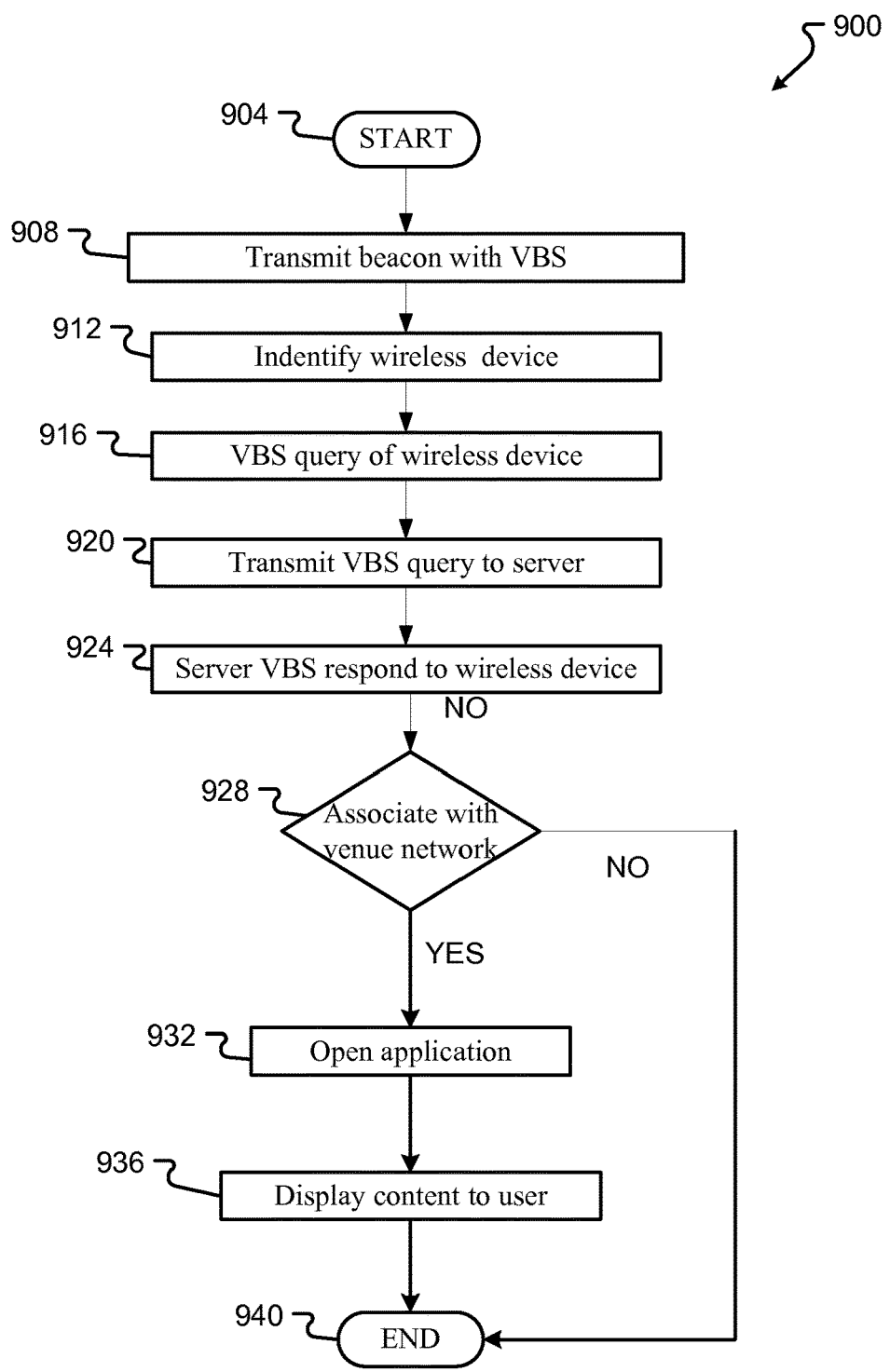
FIG. 9 is a flowchart illustrating venue based network association.

An exemplary method 900 for presenting venue based network association is shown in FIG. 9. Generally, the method 900 starts with a start operation 904 and ends with an end operation 940. The method 900 can include more or fewer steps or can arrange the order of the steps differently than those shown in FIG. 9. The method 900 can be executed as a set of computer-executable instructions executed on a computer system or processor and encoded or stored on a computer readable medium. Hereinafter, the method 900 shall be explained with reference to the systems, components, modules, software, user interfaces, etc. described in conjunction with FIG. 1-8.

A wireless device coming in proximity of an AP can access information about a specific venue with venue based services. To access the information, an access point generally transmits a beacon with venue based services (VBS) information, as depicted in step 908. Information transmitted on a beacon can include, but is not limited to Destination MAC address, network SSID, venue capability, beacon interval, etc. More details on the information carried on a beacon as well as a more detailed description of a beacon frame is found in the description in conjunction with FIGS. 6A & 6B above. Once the wireless device is located within a particular region of the AP broadcasting region, the wireless device can be identified, in step 912. Then, the wireless device through a query based mechanism can transmit user specific information to the VBS server, in steps 916 and 920. The VBS server responds to the query, in step 924, by presenting a user with, for example, an application, advertisement, and/or option to associate with the venue specific network in step 928. The response by the VBS server is made possible through a router, which provides the medium necessary for the devices on the network to communicate. Details on the process and architecture of these devices are provided above and in conjunction with FIGS. 3-8.

In step 928, the wireless device will be prompted regarding its desire to associate to the venue network. If the user of the wireless device is not interested and/or based on one or more rules on privacy settings does not wish to associate, the process ends at step 940. However, if the user would like to associate and obtain further information regarding the current venue, including advertisements, applications, applicable websites, etc., then the process continues to step 932. Steps 932 and 936 include opening and presenting the information to the wireless device.

Figure 10:
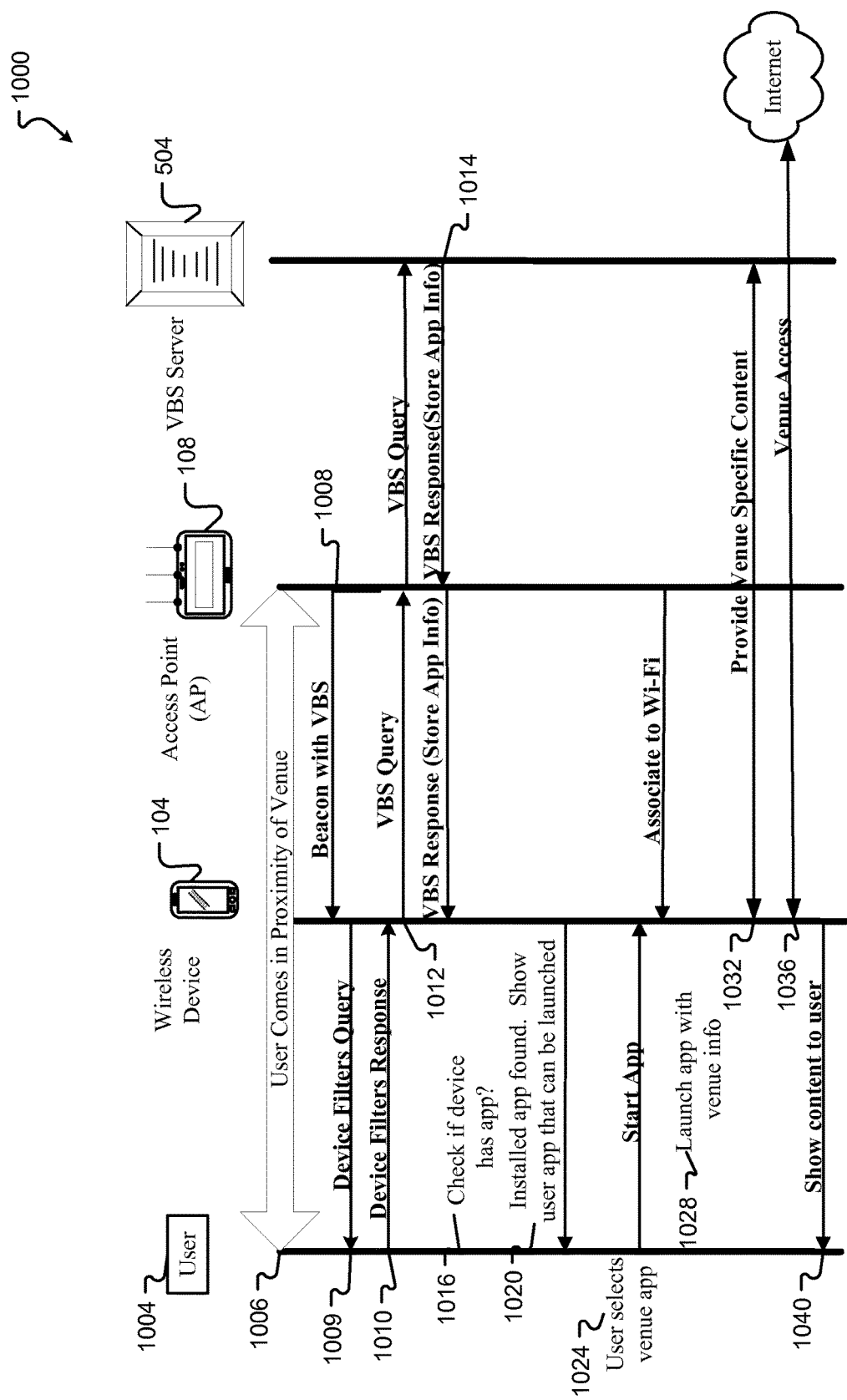
FIG. 10 illustrates an exemplary fence-post diagram showing an application discovery process.

FIG. 10 is an embodiment of an application discovery process 1000. In an exemplary embodiment, the application discovery process 1000 automatically identifies the existence of an application specific to a location. The location can generally be a venue such as, but not limited to a department store, sporting event stadium, shopping center, airport, retail shop, or the like as discussed herein. The application discovery process 1000 works when a user 1004 with a wireless device 104 comes in proximity of the specific location or venue, 1006. Much like the description above and in conjunction with FIG. 8, a VBS enabled Access Point 108 broadcasts a beacon 1008 with information relevant to the wireless device 104 and in relation to the venue. In response, the user 1004 can be queried by the wireless device 104 regarding device filters 1009 that can be set, where already set or a combination thereof, before interacting with the venue. Such filters can include security settings enable by the user allowing access to only certain secured sites, demographic information, information on the wireless device and/or other settings which limit what can be retrieved by a component or device exterior to the wireless device, such as the venue AP 108 and the VBS server 504. The user 1004, can enable or disable the settings accordingly as a response to the device filters query in 1010. Further, the mobile device can automatically set device filters prior to initiating the ANQP query/response mechanism without the need for user input. A more detailed description is found in herein and in conjunction with FIG. 14. Still further, the VBS option can be disabled in which case no association occurs with the AP 108.

Using the device filters, the wireless device 104 using a query/response mechanism sends a VBS query 1012 to the VBS server 504 with the help of the AP 108. In response, the VBS server 504 routes venue specific application information in 1014 such as application name, location ID, etc., to the wireless device 104. The wireless device 104 checks the response and application information name and tries to locate in 1016 the venue specific application in the wireless device 104. When the wireless device 104 finds the venue specific application matching the information provided by the venue, the wireless device 104 prompts the user 1004 if interested in launching the application 1020. A user 1004 if they are interested in the venue launches the application and is provided with the option to associate with the venue specific Wi-Fi network 1024. However, the user 1004 may opt out by selecting the option not to associate or through the predefined filters set on the wireless device 104. Upon connection, the venue can now present the user 1004 with venue information. The information can be presented by launching the venue specific application in 1028, connecting with the venue network and providing venue specific content in 1032 and/or accessing information associated with the venue on the Internet in 1036. In one exemplary embodiment, the wireless device 104 opens a venue specific website. In another embodiment, the website for the venue and a coupon are provided. In a further embodiment, the user is presented with a customized application, website and coupon to the location based on user preferences. The user preferences may be gathered through pre-registration when first installing application device, through query/response mechanism from above, through access to the user profile (ie., permission granted to view Facebook® page), or any other combination thereof.

Figure 11:
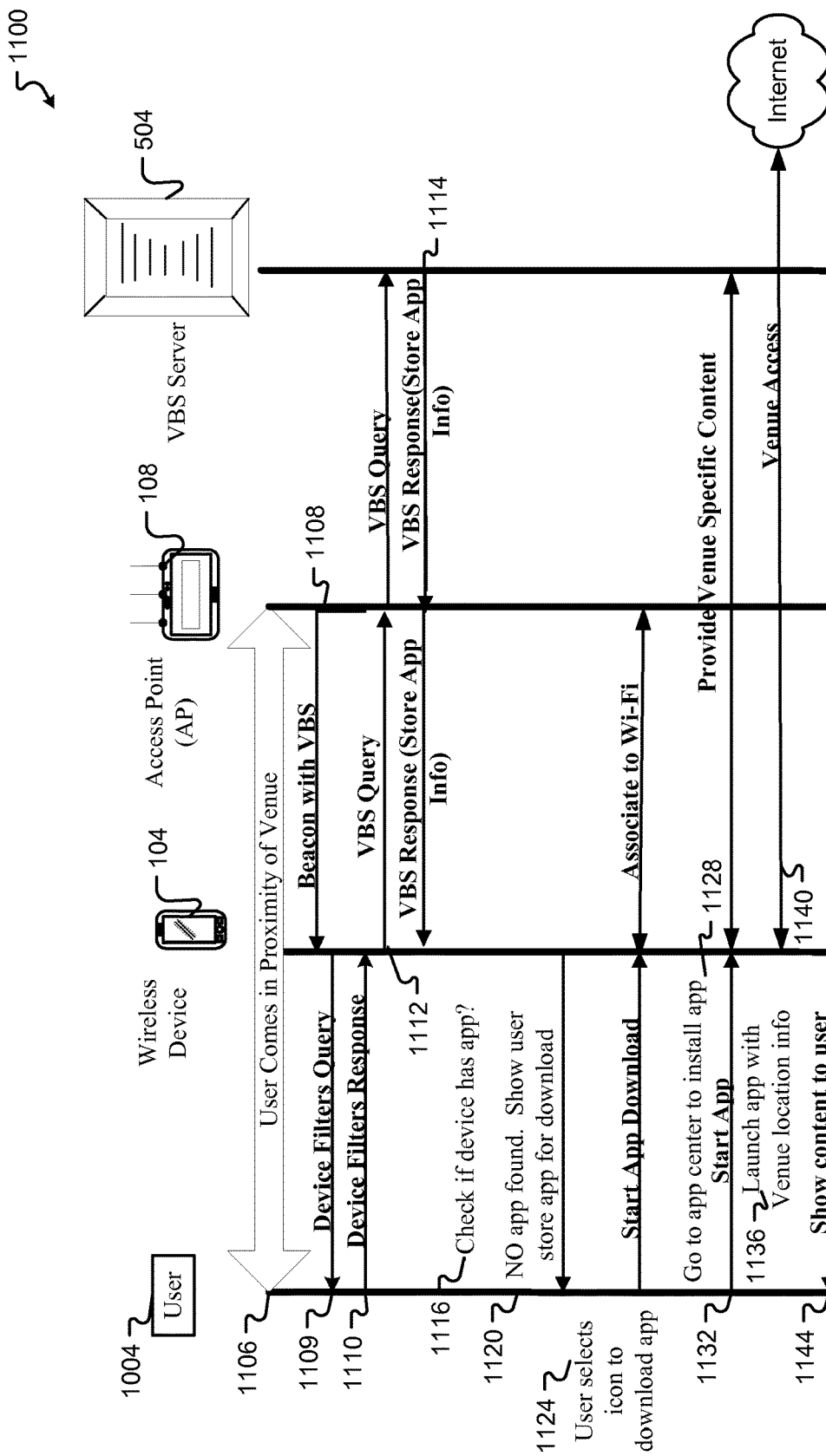
FIG. 11 illustrates an exemplary fence-post diagram showing an application discovery and install process.

FIG. 11 is an embodiment of an application discovery and installation process 1100. In an exemplary embodiment, the application discovery and install process 1100 automatically identifies an application for a specific location to install. The location can generally be a venue such as, but not limited to, a department store, sporting event stadium, shopping center, airport, retail shop, etc., and/or any location with an AP 108 with VBS enabled services as discussed. The application discovery and install process 1100 works when a user 1004 with a wireless device 104 comes in proximity 1106 of the specific location or venue. Much like the description above and in conjunction with FIG. 8, a VBS enabled access point 108 broadcasts a beacon 1108 with information relevant to the wireless device 104 and in relation to the venue. In response, the user 1004 can be queried by the wireless device 104 regarding device filters 1109 that can be set, where already set or a combination thereof, before interacting with the venue. Such filters can include security settings enable by the user allowing access to only certain secured sites, demographic information, information on the wireless device and/or other settings which limit what can be retrieved by a component or device exterior to the wireless device, such as the venue AP 108 and the VBS server 504. The user 1004, can enable or disable the settings accordingly as a response to the device filters query in 1110. A more detailed description is found below in conjunction with FIG. 14. Further, the mobile device can automatically set device filters prior to initiating the ANQP query/response mechanism without the need for user input. Still further, the VBS option can be disabled in which case no association occurs with the AP 108.

Using the device filters, the wireless device 104 using a query/response mechanism sends a VBS query 1112 to the VBS server 504 with the help of the AP 108. In response, the VBS server 504 routes venue specific application information such as application name, location ID, etc., to the wireless device 104 in 1114. The wireless device 104 checks the response and application information name and tries to locate 1116 the venue specific application in the wireless device 104. If the application cannot be identified in the wireless device 104, the user 1004 can be presented with the application downloadable options with reference to the specific application for download in 1120. A user 1004 interested in the venue and the application can select the appropriate icon and start download in 1124. In one embodiment, the user 1004 can then be prompted to associate with the venue's Wi-Fi network. In another embodiment, the user 1004 is automatically associated with the venue's Wi-Fi network. In yet another embodiment, there is no association with venue specific networks. The user 1004 is routed with or without the venue specific network to a location for downloading the application where the application is downloaded and installed in 1128 on the wireless device 104. The device user 1004 may then be prompted to start the application in 1132, where the application can include venue specific content in 1136. In one embodiment, if the user 1004 is associated with the venue network, the user 1004 can be provided with venue specific content. In another embodiment where the user 1004 did not associate with venue, the user 1004 can be presented with venue access through, for example, the Internet 1140. In yet another embodiment, a user 1004 is presented with venue content tailored for the user 1004 based on query response mechanism presented above and in conjunction with FIGS. 6-10, or information input at the time of application download in 1144 or at some other time.

Figure 12:
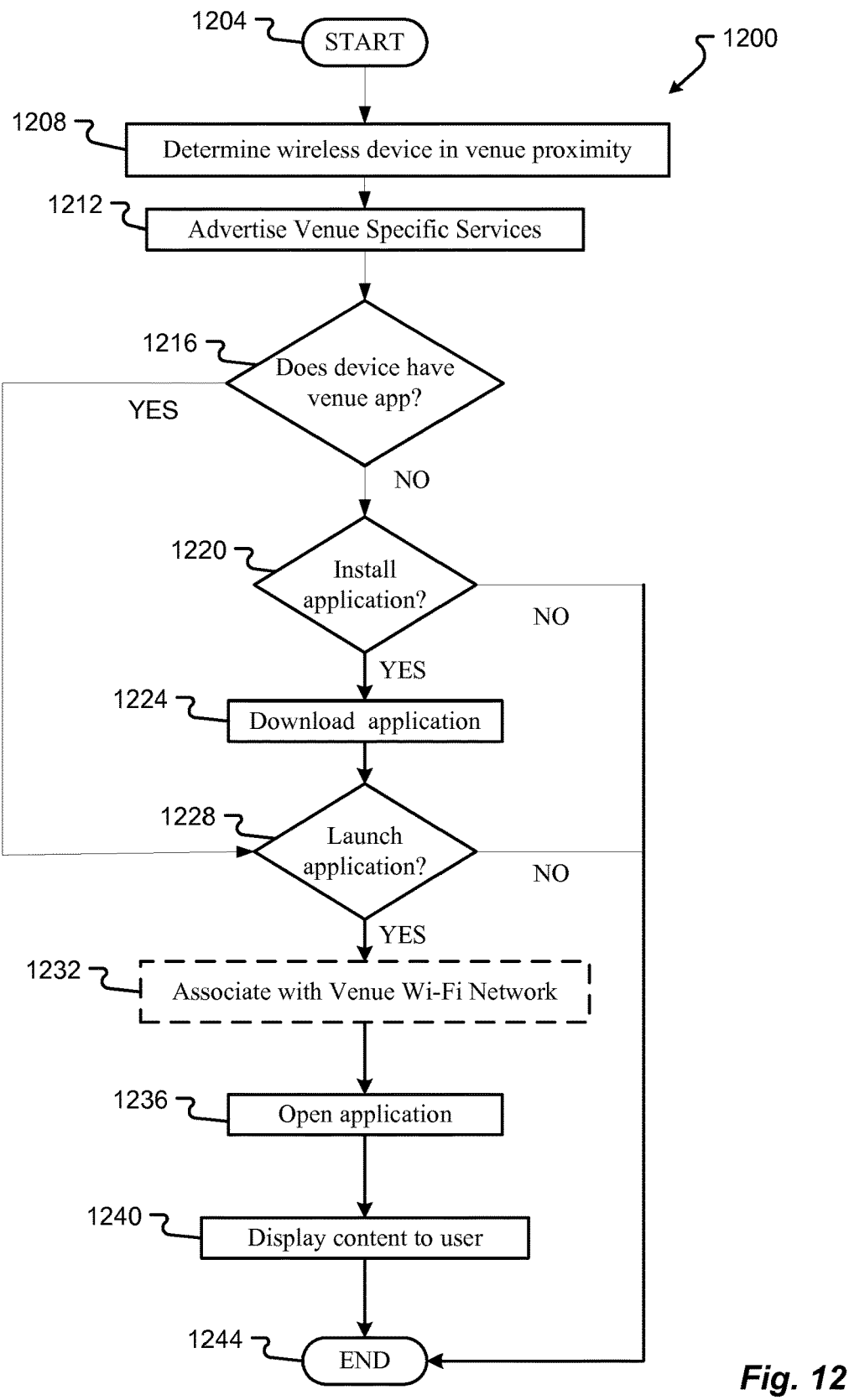
FIG. 12 is a flowchart illustrating automatic application discovery and install.

An exemplary method 1200 for automatic application discovery and install is shown in FIG. 12. Generally, the method 1200 starts with a start operation 1204 and ends with an end operation 1244. The method 1200 can include more or fewer steps or can arrange the order of the steps differently than those shown in FIG. 12. The method 1200 can be executed as a set of computer-executable instructions executed on a computer system or processor and encoded or stored on a computer readable medium. Hereinafter, the method 1200 shall be explained with reference to the systems, components, modules, software, user interfaces, etc. described in conjunction with FIG. 1-11.

Method 1200 presents a user with a method for obtaining automatic application discovery and installation for a specific venue. Step 1208 of the process begins with the determination that a wireless device is in the vicinity of an access point of a venue with venue based services. Upon detection of the device, the wireless device is presented with an advertisement of the venue specific services 1212. This can take the form of a query/response mechanism, wherein the wireless device provides a VBS server with user ID information and in response, the server presents the wireless device with venue information, including advertisements and a corresponding venue name and application name. The wireless device searches for the application identified by the VBS server, in step 1216. If the application is found, the application is presented to the user for launch, in step 1228. Alternatively, if the application is found, and it is an outdated version, the user can be prompted regarding a new application version for install. If the user is interested in the new version of the application, the process continues to step 1224 for download and installation. If the application is not found, in step 1220, the user can be prompted regarding application install. If no interest exists from the user regarding the application, venue, or both, and/or based on one or more privacy settings, the process ends at step 1244. Alternatively, if the user is interested in the application, venue, both, etc., then the application can select install in step 1220 and proceed to step 1224 for application download and install.

Now that the application is available on the wireless device, whether previously existing or through current install, the user has the option to launch the venue specific application in step 1228. Alternatively, the user will have the option to associate with the venue specific network in step 1232 first. The application is opened in step 1236 and content is displayed in step 1240. The content provided to the user can vary. In one embodiment, the user can simply be presented with the general venue application. In another embodiment, the user is presented with the general application and the venue website. In yet another embodiment, the user is presented with the application, website and coupons tailored for user preferences. In general, any information can be provided to the user.

Figure 13:
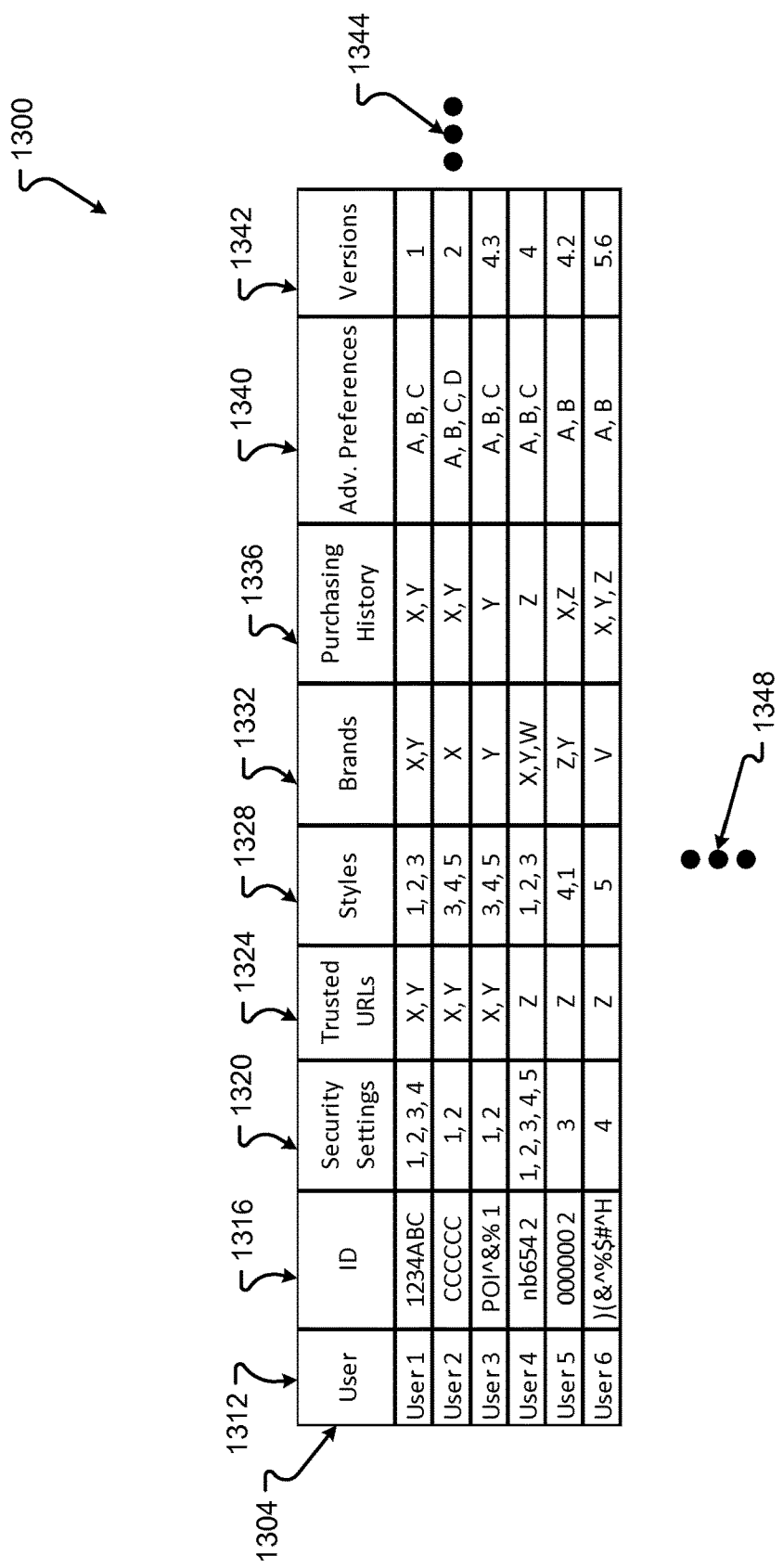
FIG. 13 illustrates an exemplary data structure for storing user information.

FIG. 13 depicts an embodiment of a data structure 1300 to store user preferences associated with a venue. The data structure 1300 may include one or more of data files or data objects 1304. Thus, the data structure 1300 may represent different types of databases or data storage, for example, object-oriented databases, flat file data structures, relational database, or other types of data storage arrangements. Furthermore, the data structure 1300 may be used to represent advertisement profiles for different users. Even further, the data structure can be stored on the wireless device 104, the VBS server memory/storage, an ANQP repository, an independent storage module, and/or a combination thereof. As indicated in FIG. 13, there may be more or fewer portions in the data structure 1300, as represented by ellipses 1344. Further, there may be more or fewer files in the data structure 1300, as represented by ellipses 1348.

Referring to FIG. 13, a first data structure is shown, which may include user information or profile. The data file 1304 may include several portions 1312-1342 representing different types of data. Each of these types of data may be associated with a user, as shown in user portion 1312. Each user has a user profile or preferences that the venue maintains in the data structure 1300. As provided herein, the user can be any person that uses the wireless device and associates with the venue. Each user can be identified by a unique identifier stored in portion 1316. The user identifiers (IDs) can be a series of numbers, letters, symbols, other type of data, and/or the combination thereon. These IDs are a string of unique codes that could be created by the user, created by the system, and/or created by the venue, which allows the VBS server to identify the user. The IDs can also be created when the user registers with the specific venue or when it installs the venue specific application and the user indicates his/her preferences. The user IDs can be used by the VBS server to retrieve user preferences and other contextual information from the data structure 1300. As exemplary in portion 1316, these IDs can be any combination of letters, numbers and symbols.

Each user, identified in portion 1312, may have a different brand and/or style preferences corresponding to the venue (i.e. shopping center, department store, a sporting arena, etc.). The brands can be stored in portion 1332. Styles may be stored in portion 1328 of the data file 1304. Preferred brands and styles may be detected from access to secured sites or through purchasing history observed. Purchasing history for the specific venue can also be stored independently in portion 1336 of the data structure 1300. Brands can be directed to, but not limited to, food, clothing, hobbies, entertainment, etc. For example, a person with a preference for Nike sportsware can be stored in X and Nikon cameras in Y, etc. The styles portion 1328 can be directed to clothing such as, but not limited to western, ethnic, cultural, athletic, and user fashion styles. Therefore, style 1 can represent western, 2 represents athletic clothing preference, 3 retro, etc. A similar approach and portion in the data structure can be added directed to decorating styles, i.e., western, contemporary, modern, etc.

Each user, identified in portion 1312, can have a different set of advertisement preferences. One or more preferences may be stored in portion 1340. These preferences include the type of advertisement the user responds most positively to. For example, a user may get a text regarding a sale in a department store and shortly thereafter stop and make a purchase at the store. Another example could include the user is redirected to the venue website, which includes a coupon. This user takes advantage of the coupon over the sale above. These preferences and responses can also be recorded in portion 1340. Therefore, in advertising preferences portion 1340, an A can represent the user uses or responds to coupon advertising, B can be text messages, C can represent sale advertisements on the website, etc. Therefore, for example, a user 5 will be provided with coupons and text advertising as indicated under advertising preferences portion 1340.

Each user, identified in portion 1312, can have various versions of the venue specific application. A user can, for example, already have an installed venue application; however it may be an older version. Version information can be stored in portion 1342 of the data structure 1300. The version information can be useful when the mobile device is running the application discovery, the mobile device can prompt the user if the user is interested in installing a newer version. Since applications are constantly updated, various versions exists, exemplary of what portion 1342 can include is version 1, 2, 3, 3.1, 4, 4.2, 4.3, 5, 5.6, etc. Therefore, a user 1 with version 1, can be prompted to install a newer version. This is explained in further detail in conjunction with FIGS. 10-12. Version information stored in portion 1342 can also be used in providing tailored advertisements.

To ensure user security, data structure 1300 can also be equipped with security settings that can limit the information accessed by the venue. These setting can be stored in portion 1320. For example, a 1 represents the venue has received permission to access a user's age, 2 the marital status, 3 hobbies, etc. Thus the more numbers, the more liberty the venue has in advertising and tailoring the services provided to the user. Further, the user can limit the websites that may be accessed by the venue. The URLs to these trusted sites can be stored in portion 1324. For example, a user may be prompted if Facebook® can be accessed by the venue. The response by the user can be stored and the URL added to the trusted site portion 1324 as X for example. Another example includes a venue that is a sports arena. The venue retrieves the trusted Facebook® site and reads posts on the Dallas Cowboys, the venue advertises football tickets.

Figure 14:
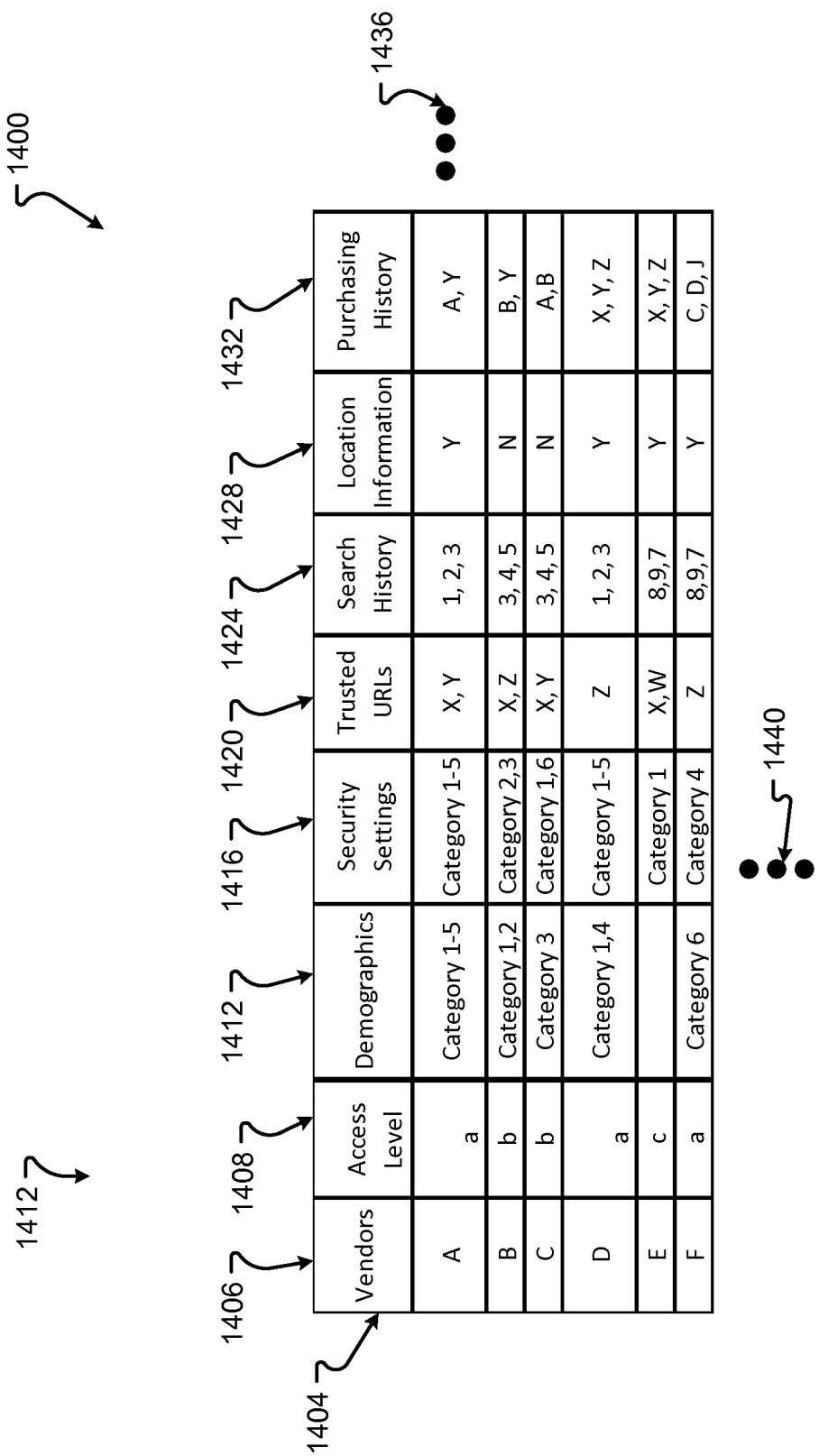
FIG. 14 illustrates an exemplary data structure for storing user information.

FIG. 14 depicts an embodiment of a data structure 1400 to store user preferences and filters associated with a venue. The data structure 1400 may include one or more of data files or data objects 1404. Thus, the data structure 1400 may represent different types of databases or data storage, for example, object-oriented databases, flat file data structures, relational database, or other types of data storage arrangements. Furthermore, the data structure 1400 may be used to protect wireless device users and filter the information accessible by external devices or locations. Even further, the data structure can be stored on the wireless device 104, the VBS server memory/storage, an ANQP repository, an independent storage module, and/or a combination thereof. As indicated in FIG. 14, there may be more or fewer portions in the data structure 1400, as represented by ellipses 1436. Further, there may be more or fewer files in the data structure 1400, as represented by ellipses 1440.

Referring to FIG. 14, a first data structure is shown, which may include user information or profile. The data file 1404 may include several portions 1406-1432 representing different types of data. Each of these types of data may be associated with a user and the user can be any person that uses the wireless device. The data can be settings that will either permit or prohibit a venue, access to user information on the wireless device.

In receiving a beacon from an access point, the wireless device can prompt a user with a device filter query in which certain settings can be enabled or disabled. These settings can then be stored on the wireless device for future use or transmitted as part of the ANQP query/response mechanism for use by the venue. The device filter query can include new settings, previously populated settings, and/or a combination thereof. Filter settings, can also be pre-populated and automatically filled and transmitted in conjunction with the ANQP query sent by the wireless device to the AP without user input each time the wireless device is in the vicinity of the venue's AP. Further, the user can disable all venue services by disabling VBS.

Filter settings can include different data. One such data can be vendors. Vendors, stored under the vendor portion 1406 can be a list of vendors that, for example, the wireless device has encountered (by entering the geo-fence), the user has browsed, etc. Various vendors can be stored and placed in partition 1406, where a different letter represents a different vendor.

A user can also have varying preferences based on the vendor. As an illustration, the user may want any and all advertisements from Walmart, but only wants certain ads from Target. For this, the user can have varying access levels for the corresponding vendors. For example, there can be an option a, where all advertisements, coupons, text messages, etc. are allowed from that vendor. Next, there can be an access level b that can be a limited option, where the vendor is of possible or minimal interest and as such as some access to information obtained from the user and advertising is restricted. For example, the user would like an ad from the vendor when visiting the venue, but would not like any future propaganda. Then, there can exist an access level c, where these vendors have no access to any information on the wireless device and the user does not want any advertisements or applications from them. Thus, as an illustration, vendor E with access level c, corresponds to a vendor the user has no interest obtaining information from. Other access levels can exit as can different permutations such as only coupons, no advertisements, etc.

Another setting that can be available for a user to enable/disable, can be user demographics, which can be stored in Demographics portion 1412. A user's demographic information can include, but not limited to, age, date of birth, marital status, household size, income, gender, ethnicity, etc. When the user receives the device filter query, the user can determine which of these if any or in addition to the specific venue, or any external device in general can obtain. For example, if the user is visiting a department store, the user may allow the venue to collect information regarding number of children in the household, age groups, even gender, which in response the venue can provide the user with coupons for children's clothing, shoes, etc. Another example could be permitting the venue to obtain information about the person's occupation, such as a lawyer, the venue can present a user with a sale on business suits. Therefore, a vendor A, with access level a, can provide the user with any advertisement, coupon, etc. Vendor A also has access to the user's demographics falling in categories 1-5, where, for example, a Category 1 can be age, Category 2 marital status, Category 3 occupation, Category 4 household size, Category 5 age, etc. Similarly, Vendor E cannot provide any advertisements and does not have access to any of the user's demographic information.

To ensure user security, data structure 1400 can be equipped to store user security settings that can limit the information accessed by the venue. These setting can be stored in portion 1416. For example, in security settings, the user can enable access to demographic information, but bars access to any bank information that could be stored in the wireless device. Therefore, as more fields are added to the security level, the more restrictive the access to information is. For example, vender E again only has access to category 1 for example which could represent the user's name, outside of the user's name, vendor E has no other access. Like demographics, the more categories, the more access the vendor has. The user can also limit websites that may be accessed by the venue. The URLs to these trusted sites can be stored in portion 1420. An example of access to trusted websites can include for example, the user permits open access to their LinkedIn® profile. The venue can use this information on the website to gather information on user preferences. For example the venue gathers a user's alma mater from his/her LinkedIn® account and advertises game day tickets, sportware or the like. Thus, LinkedIn® can be stored as X in portion 1420.

Search History, is another filter that can be set and stored in portion 1424 of the data structure 1400. The user can enable/disable search history. This information, if permitted, could allow a venue to tailor advertisements based on the websites the user has frequented. The time/date sites where viewed, duration of visit, link, and which sites in particular are examples of what can be accessed, filters can be set for and stored in Search History portion 1424. The numbers in the Search history represent the time, duration, number of times visited, etc.

The user can also enable/disable location history and location information for retrieval by external devices or locations. A user may want to protect where he/she frequented and routes taken. Geographical location gathered by the wireless device can be set and stored in portion 1428. If permitted, a venue can use the routes taken by the user to present coupons to the user. For example, if the venue understands that a user travels near a Starbucks en route to work every day, the venue (Starbucks) can present the user with a coupon to trigger a purchase while in the current vicinity of the venue or in the future (i.e., en route to work). Therefore, a Y would represent a yes to accessing location and N represents no.

Purchasing History in portion 1432, would be a repository of recent purchases made by the user. If the user is interested, he/she can permit the venue to access recent purchases made. This again, can be used for tailored advertisement by the venue and discounts for the user. Items of clothing, electronics, furniture, etc., can each be represented by a different letter as exemplary in portion 1432.

Current embodiments provide solutions that remove the complexity of using venue specific applications and address the issues arising from application pollution. In one embodiment, a technique for providing venue specific application advertisement over Wi-Fi networks is described. In another embodiment, the automatic detection of pre-existing venue specific applications on wireless devices is described. Still in another embodiment, user preferences stored in a data structure used to tailor information presented to the user is presented. Still yet in another embodiment, user specific advertising on the application or by a venue specific URL is explained.

Embodiments are thus directed toward a wireless device for receiving frames, comprising: a memory; a processor; a transceiver, the transceiver configured to: receive a beacon frame with venue specific services, wherein the beacon frame includes a user reference information element; transmit a venue query with device specific information and request for a plurality of information elements; and receive a venue response, in response to the transmitted venue query, wherein the venue response comprises an access network query protocol providing the transceiver with at least one of the plurality of information elements, and wherein the at least one of the plurality of information elements is a venue based services query information element. Aspects of the above wireless device include wherein the venue based services query information element indicates a server is venue based services enabled or provides venue based services. Aspects of the above wireless device include wherein the beacon frame includes a length user preference information element. Aspects of the above wireless device include wherein the venue query includes one or more of user preferences or access levels and a user identification. Aspects of the above wireless device include wherein the venue response includes a venue specific application information, and wherein the venue specific application information automatically triggers application discovery on the wireless device. Aspects of the above wireless device include wherein the application discovery detects a venue specific application, wherein the application discovery also prompts a user to launch the venue specific application or automatically starts the venue specific application, and wherein the application discovery further prompts one or more of the user to associate with a venue specific network or automatically associates with the venue specific network. Aspects of the above wireless device include wherein association with the venue specific network presents the user with one or more of: a tailored website, a venue specific application, and a customized venue specific application for the user. Aspects of the above wireless device include wherein the user is prompted to install the venue specific application when the application discovery fails.

Embodiments include a method for processing venue services, the method comprising: receiving, by a transceiver, a beacon frame with venue specific services, wherein the beacon frame includes a user preferences information element; transmitting, by the transceiver, a venue query with device specific information and request for a plurality of information elements; and receiving, by the transceiver, a venue response in response to the transmitted venue query, wherein the venue response includes a venue based services query information element. Aspects of the above method include wherein the venue based services query information element indicates a server is venue based services enabled or provides venue based services. Aspects of the above method include wherein the beacon frame includes a length user preference information element. Aspects of the above method include wherein the venue query includes one or more of user preferences or access levels and a user identification. Aspects of the above method include wherein the user preferences include trusted sites and security settings. Aspects of the above method include wherein venue response includes a network access identifier. Aspects of the above method include wherein the venue response includes a venue specific application information, and wherein the venue specific application information automatically triggers application discovery on the wireless device. Aspects of the above method include wherein the application discovery detects a venue specific application, wherein the application discovery also prompts a user to launch the venue specific application or automatically starts the venue specific application, and wherein the application discovery further prompts one or more of the user to associate with a venue specific network or automatically associates with the venue specific network. Aspects of the above method include wherein association with the venue specific network presents the user with one or more of: a tailored website, a venue specific application, and a customized venue specific application for the user. Aspects of the above method include wherein the user is prompted to install the venue specific application when the application discovery fails.

Embodiments include a non-transitory computer readable medium having instructions thereon that when executed by at least one processor of a wireless device perform a method comprising: receiving, by a transceiver, a beacon frame with venue specific services, wherein the beacon frame includes a user preferences information element; transmitting, by the transceiver, a venue query with device specific information and request for a plurality of information elements; and receiving, by the transceiver, a venue response in response to the transmitted venue query, wherein the venue response includes a venue based services query information element. Aspects of the above media include wherein the venue based services query information element indicates a server is venue based services enabled or provides venue based services. Aspects of the above media include wherein the beacon frame includes a length user preference information element. Aspects of the above media include wherein the venue query includes one or more of user preferences or access levels and a user identification, wherein the user preferences includes trusted sites and security settings. Aspects of the above media include wherein venue query further comprises an access network query protocol providing the device with venue specific application information. Aspects of above media include wherein the venue specific application information received automatically triggers an application discovery on a device, wherein the application discovery detects a venue specific application, wherein the application discovery also prompts a user to launch the venue specific application or automatically starts the venue specific application, and wherein the application discovery further prompts one or more of the user to associate with a venue specific network or automatically associates with the venue specific network. Aspects of the above media include wherein the user is prompted to install the venue specific application if the application discovery fails.

Embodiments include a system comprising: means for receiving a beacon frame with venue specific services, wherein the beacon frame includes a user preferences information element; means for transmitting a venue query with device specific information and request for a plurality of information elements; and means for receiving a venue response in response to the transmitted venue query, wherein the venue response includes a venue based services query information element. Aspects of the above system include wherein the venue based services query information element indicates a server is venue based services enabled or provides venue based services. Aspects of the above system include wherein the beacon frame includes a length user preference information element. Aspects of the above system include wherein the venue query includes one or more of user preferences or access levels and a user identification, wherein the user preferences includes trusted sites and security settings. Aspects of the above system include wherein venue query further comprises an access network query protocol providing the device with venue specific application information. Aspects of the above system include wherein the venue specific application information received automatically triggers an application discovery on a device, wherein the application discovery detects a venue specific application, wherein the application discovery also prompts a user to launch the venue specific application or automatically starts the venue specific application, and wherein the application discovery further prompts one or more of the user to associate with a venue specific network or automatically associates with the venue specific network. Aspects of the above system include wherein the user is prompted to install the venue specific application if the application discovery fails.

Embodiments include a communication device for transmitting frames, comprising: a memory; a processor; a transceiver, the transceiver configured to: transmit a beacon frame with venue specific services, wherein the beacon frame includes a user reference information element; receive a venue query with device specific information and request for a plurality of information elements; and transmit a venue response, in response to received venue query, wherein the venue response comprises an access network query protocol with at least one of the plurality of information elements, and wherein the at least one of the plurality of information elements is a venue based services query information element.

The exemplary embodiments are described in relation to venue based services on WLAN. However, it should be appreciated, that in general, the systems and methods herein will work equally well for any type of communication system in any environment utilizing any one or more protocols including wired communications, wireless communications, powerline communications, coaxial cable communications, fiber optic communications and the like.

The exemplary systems and methods are described in relation to IEEE 802.11 transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an 802.11 transceiver, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, 802.11u, WiFi, LTE, LTE Unlicensed, 4G, Bluetooth®, WirelessHD, WiGig, 3GPP, Wireless LAN, WiMAX.

The term transceiver as used herein can refer to any device that comprises hardware, software, firmware, or combination thereof and is capable of performing any of the methods described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided systems and methods for venue based services for Wi-Fi and wireless location based technologies. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A wireless device, comprising:
   a memory;
   a processor;
   a transceiver, the transceiver, before association with an access point, configured to:
   receive a beacon frame with venue specific services, wherein the beacon frame includes a user preference information element, wherein the venue specific services correspond to a specific location and the beacon frame is received within a geo-fence of a venue;
   transmit a venue query with device specific information and request for a plurality of information elements;
   receive a venue response, in response to the transmitted venue query, wherein the venue response comprises an access network query protocol providing the transceiver with at least one of the plurality of information elements, and wherein the at least one of the plurality of information elements is a venue based services query information element;
   determine whether a venue specific application is installed on the wireless device; and
   receive, after association with the access point, venue specific content.

2. The wireless device of claim 1, wherein the venue based services query information element indicates a server is venue based services enabled or provides venue based services.

3. The wireless device of claim 1, wherein the beacon frame includes a length user preference information element.

4. The wireless device of claim 1, wherein the venue query includes one or more of user preferences or access levels and a user identification.

5. The wireless device of claim 1, wherein the venue response includes a venue specific application information, and wherein the venue specific application information automatically triggers application discovery on the wireless device.

6. The wireless device of claim 5, wherein the application discovery detects a venue specific application, wherein the application discovery also prompts a user to launch the venue specific application or automatically starts the venue specific application, and wherein the application discovery further prompts one or more of the user to associate with a venue specific network or automatically associates with the venue specific network.

7. The wireless device of claim 6, wherein association with the venue specific network presents the user with one or more of: a tailored website, a venue specific application, and a customized venue specific application for the user.

8. The wireless device of claim 5, wherein the user is prompted to install the venue specific application when the application discovery fails.

9. A method comprising:
   receiving, by a transceiver before association with an access point, a beacon frame with venue specific services, wherein the beacon frame includes a user preferences information element, wherein the venue specific services correspond to a specific location and the beacon frame is received within a geo-fence of a venue;

transmitting, by the transceiver, a venue query with device specific information and request for a plurality of information elements;

receiving, by the transceiver, a venue response in response to the transmitted venue query, wherein the venue response includes a venue based services query information element;

determine whether a venue specific application is installed on the wireless device; and receive, after association with the access point, venue specific content.

10. The method of claim 9, wherein the venue based services query information element indicates a server is venue based services enabled or provides venue based services.

11. The method of claim 9, wherein the beacon frame includes a length user preference information element.

12. The method of claim 9, wherein the venue query includes one or more of user preferences or access levels and a user identification.

13. The method of claim 12, wherein the user preferences include trusted sites and security settings.

14. The method of claim 9, wherein venue response includes a network access identifier.

15. The method of claim 9, wherein the venue response includes a venue specific application information, and wherein the venue specific application information automatically triggers application discovery on the wireless device.

16. The method of claim 15, wherein the application discovery detects a venue specific application, wherein the application discovery also prompts a user to launch the venue specific application or automatically starts the venue specific application, and wherein the application discovery further prompts one or more of the user to associate with a venue specific network or automatically associates with the venue specific network.

17. The method of claim 16, wherein association with the venue specific network presents the user with one or more of: a tailored website, a venue specific application, and a customized venue specific application for the user.

18. The method of claim 16, wherein the user is prompted to install the venue specific application when the application discovery fails.

19. A non-transitory computer readable medium having instructions thereon that when executed by at least one processor of a wireless device perform a method comprising:

receiving, by a transceiver before association with an access point, a beacon frame with venue specific services, wherein the beacon frame includes a user preferences information element, wherein the venue specific services correspond to a specific location and the beacon frame is received within a geo-fence of a venue;

transmitting, by the transceiver, a venue query with device specific information and request for a plurality of information elements;

receiving, by the transceiver, a venue response in response to the transmitted venue query, wherein the venue response includes a venue based services query information element;

determine whether a venue specific application is installed on the wireless device; and receive, after association with the access point, venue specific content.

20. The non-transitory medium of claim 19, wherein the venue based services query information element indicates a server is venue based services enabled or provides venue based services.

21. The non-transitory medium of claim 19, wherein the beacon frame includes a length user preference information element.

22. The non-transitory medium of claim 19, wherein the venue query includes one or more of user preferences or access levels and a user identification, wherein the user preferences includes trusted sites and security settings.

23. The non-transitory medium of claim 19, wherein venue query further comprises an access network query protocol providing the device with venue specific application information.

24. The non-transitory medium of claim 19, wherein the venue specific application information received automatically triggers an application discovery on a device, wherein the application discovery detects a venue specific application, wherein the application discovery also prompts a user to launch the venue specific application or automatically starts the venue specific application, and wherein the application discovery further prompts one or more of the user to associate with a venue specific network or automatically associates with the venue specific network.

25. A communication device, comprising:

a memory;

a processor;

a transceiver, the transceiver configured to:

transmit, before association with a wireless device, a beacon frame with venue specific services, wherein the beacon frame includes a user preference information element, wherein the venue specific services correspond to a specific location defined by a geo-fence;

receive a venue query with device specific information and request for a plurality of information elements;

transmit a venue response, in response to received venue query, wherein the venue response comprises an access network query protocol with at least one of the plurality of information elements, and wherein the at least one of the plurality of information elements is a venue based services query information element; and transmit, after association with the access point and based on whether a venue specific application is installed on the wireless device, venue specific content.

* * * * *